United States Patent
Yamamura et al.

(10) Patent No.: US 9,535,839 B2
(45) Date of Patent: Jan. 3, 2017

(54) ARITHMETIC PROCESSING DEVICE, METHOD OF CONTROLLING ARITHMETIC PROCESSING DEVICE, AND INFORMATION PROCESSING DEVICE

(71) Applicant: FUJITSU LIMITED, Kawasaki-shi, Kanagawa (JP)

(72) Inventors: Shuji Yamamura, Yokohama (JP); Go Sugizaki, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 14/589,023

(22) Filed: Jan. 5, 2015

(65) Prior Publication Data

US 2015/0193346 A1    Jul. 9, 2015

(30) Foreign Application Priority Data

Jan. 6, 2014  (JP) ................................ 2014-000251

(51) Int. Cl.
*G06F 12/08* (2016.01)
*G06F 9/30* (2006.01)
*G06F 9/38* (2006.01)

(52) U.S. Cl.
CPC ....... *G06F 12/0833* (2013.01); *G06F 9/30047* (2013.01); *G06F 9/30087* (2013.01);
(Continued)

(58) Field of Classification Search
CPC  G06F 9/30087; G06F 9/3834; G06F 12/0833; G06F 2212/621; G06F 9/30047; G06F 9/3851; G06F 12/0842
See application file for complete search history.

(56) References Cited

U.S. PATENT DOCUMENTS

2004/0186861 A1 *  9/2004  Phatak .............. G06F 17/30132
2010/0017572 A1     1/2010  Koka et al.
(Continued)

FOREIGN PATENT DOCUMENTS

JP      2008-515055      5/2008
JP      2012-509529      4/2012
(Continued)

OTHER PUBLICATIONS

Extended European Search Report dated Oct. 23, 2015 for corresponding European Patent Application No. 14200107.2, 13 pages.
*Please note US-2010-0131953-A1, US-2013-0339618-A1 and US-2014-0040567-A1 cited herein, were previously cited in an IDS filed on Jun. 25, 2015.*
(Continued)

*Primary Examiner* — Hashem Farrokh
(74) *Attorney, Agent, or Firm* — Fujitsu Patent Center

(57) ABSTRACT

An arithmetic processing device has a first arithmetic processing unit including a first instruction controller that controls a write instruction to a memory and a first cache unit, and a second arithmetic processing unit including a second instruction controller and a second cache unit. The first arithmetic processing unit transmits an invalidation request to the second arithmetic processing unit when a write request to the memory is issued within a first transaction, and in response to the invalidation request, the second cache unit determines whether a second transaction is to be aborted based on information in the invalidation request when the second transaction conflicts with the first transaction for a cache block corresponding to a destination of the write request, and sends a determination result to the first arithmetic processing unit.

11 Claims, 22 Drawing Sheets

(52) U.S. Cl.
 CPC .......... *G06F 9/3834* (2013.01); *G06F 9/3851* (2013.01); *G06F 2212/621* (2013.01)

(56) References Cited

U.S. PATENT DOCUMENTS

| | | | |
|---|---|---|---|
| 2010/0131953 A1* | 5/2010 | Dice | G06F 9/466 718/101 |
| 2010/0169894 A1 | 7/2010 | Sheaffer et al. | |
| 2010/0199048 A1* | 8/2010 | Cypher | G06F 12/0817 711/141 |
| 2011/0145512 A1* | 6/2011 | Adl-Tabatabai | G06F 9/466 711/141 |
| 2013/0339618 A1 | 12/2013 | Alexander et al. | |
| 2014/0040567 A1 | 2/2014 | Pohlack et al. | |
| 2014/0136783 A1 | 5/2014 | Kumar et al. | |
| 2015/0089152 A1* | 3/2015 | Busaba | G06F 12/0831 711/141 |

FOREIGN PATENT DOCUMENTS

| | | |
|---|---|---|
| WO | 2006/039174 | 4/2006 |
| WO | 2010/077872 | 7/2010 |

OTHER PUBLICATIONS

Partial European Search Report dated Jun. 5, 2015 for corresponding European Patent Application No. 14200107.2, 5 pages.

* cited by examiner

FIG.1

TRANSACTION:
00 TxStart
01 ld  [0x1], %g1
02 add %g1, 1, %g1
03 st  %g1, [0x1]
04 TxEnd

FIG.11

CACHE TAG 124

| R | W | TAG ADDRESS | V |
|---|---|---|---|
| 1 | 0 | 0x0a1e818c | 1 |
| 0 | 1 | 0x6daf8eec | 1 |
| 1 | 0 | 0x5f4b51ec | 1 |
| ... | | | |

ARITHMETIC PROCESSING DEVICE, METHOD OF CONTROLLING ARITHMETIC PROCESSING DEVICE, AND INFORMATION PROCESSING DEVICE

CROSS-REFERENCE TO RELATED APPLICATION

This application is based upon and claims the benefit of priority of the prior Japanese Patent Application No. 2014-000251, filed on Jan. 6, 2014, the entire contents of which are incorporated herein by reference.

FIELD

The present invention relates to an arithmetic processing device, a method of controlling the arithmetic processing device, and an information processing device.

BACKGROUND

In parallel processing under the environment of a multi-CPU core having a plurality of central processing unit (CPU) cores or a multi-CPU having a plurality of CPUs (hereinafter CPU core and CPU are referred to as a CPU), a plurality of CPUs shares the same address space and executes a store instruction (write) and a load instruction (read) with respect to the same memory. In this case, a plurality of CPUs accesses the same memory address and writes data thereto. Due to this, exclusive processing which uses locks is known as a mechanism for mediating such accesses.

In exclusive processing which uses locks, in a period where a plurality of CPUs are executing respective threads, a CPU executes a lock acquisition operation before executing a write operation to a shared memory, executes a write operation when a lock is acquired, and after that, executes an operation of releasing the lock. In a locked state, since lock acquisition by another thread is inhibited, a write operation to the shared memory is performed exclusively, and coherency of data within a memory is maintained.

However, exclusive processing which uses locks is a burden for programmers and causes bugs. Thus, a transactional memory which performs exclusive processing instead of locks has been proposed.

In a transactional memory, a series of accesses to a shared memory is referred to as a transaction. In the transactional memory, when a thread of a certain CPU accesses a shared memory and a thread of another CPU also accesses the shared memory, conflict of accesses is checked. When an access conflict is detected, a plurality of conflicting threads aborts the executing transactions, returns to the state before the transactions were started and executes the transactions again.

The above matters are disclosed in JP2008-515055 and JP2012-509529.

Two types of transactional memories have been proposed, including a software transactional memory which implements a transactional memory with software and a hardware transactional memory which implements a transactional memory with hardware. A hardware transactional memory is advantageous in that it poses a lesser programming burden on programmers, but is not able to perform complex determination processes. Thus, only transactions of threads of a specific CPU may be repeatedly aborted, and consequently, deadlocks may occur.

When aborts occur repeatedly, the control is handed over to a software abort handler and processing using locks is performed. As a result, the performance of a transactional memory may deteriorate.

SUMMARY

According to a first aspect of an embodiment is an arithmetic processing device comprising:

a first arithmetic processing unit including a first instruction controller that controls a write instruction to a memory and a first cache unit having a first cache memory; and a second arithmetic processing unit including a second instruction controller that controls a write instruction to the memory and a second cache unit having a second cache memory, wherein the first arithmetic processing unit transmits an invalidation request to the second arithmetic processing unit when a write request to the memory is issued within a first transaction in execution by the first arithmetic processing unit, and in response to the invalidation request, the second cache unit of the second arithmetic processing unit determines whether a second transaction in execution by the second arithmetic processing unit is to be aborted based on information included in the invalidation request when the second transaction conflicts with the first transaction for a cache block corresponding to a destination of the write request, and sends a determination result to the first arithmetic processing unit.

According to a first aspect of an embodiment, since conflicting transactions between a plurality of arithmetic processing units are mediated according to a predetermined determination logic, it is possible to suppress a decrease in performance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a program example of a transaction.

FIG. 11 is a diagram illustrating a configuration of the cache tag 124.

DESCRIPTION OF EMBODIMENTS

FIG. 1 is a diagram illustrating a program example of a transaction. In this program, a transaction involving a series of accesses to a shared memory is defined by a TxStart instruction at Address 00 and a TxEnd instruction at Address 04. That is, the TxStart and TxEnd instructions are instructions that informs a CPU of the start and the end of a transaction. Address 01 defines a load instruction of reading data in 0x1 address from a memory and loading the same in a variable % g1, Address 02 defines an add instruction of adding "1" to the variable % g1, and Address 03 defines a store instruction of writing an addition result to 0x1 address of the memory. Thus, FIG. 1 illustrates a program of an addition operation of adding "1" to data in a memory and writing back the data in the memory, which is a program indicating a transaction which needs exclusive processing since the program includes a store instruction (write instruction) on a shared memory.

When a CPU core executes such a transaction as illustrated in FIG. 1, exclusive processing is performed so that a transaction of another CPU core does not execute a write instruction to the same address in the memory. In this manner, when a write instruction is executed on a shared memory, it is checked whether the write instruction conflicts with another write instruction. When the instructions conflict with each other, exclusive processing is executed so that the write instructions are performed exclusively.

Figure 2:
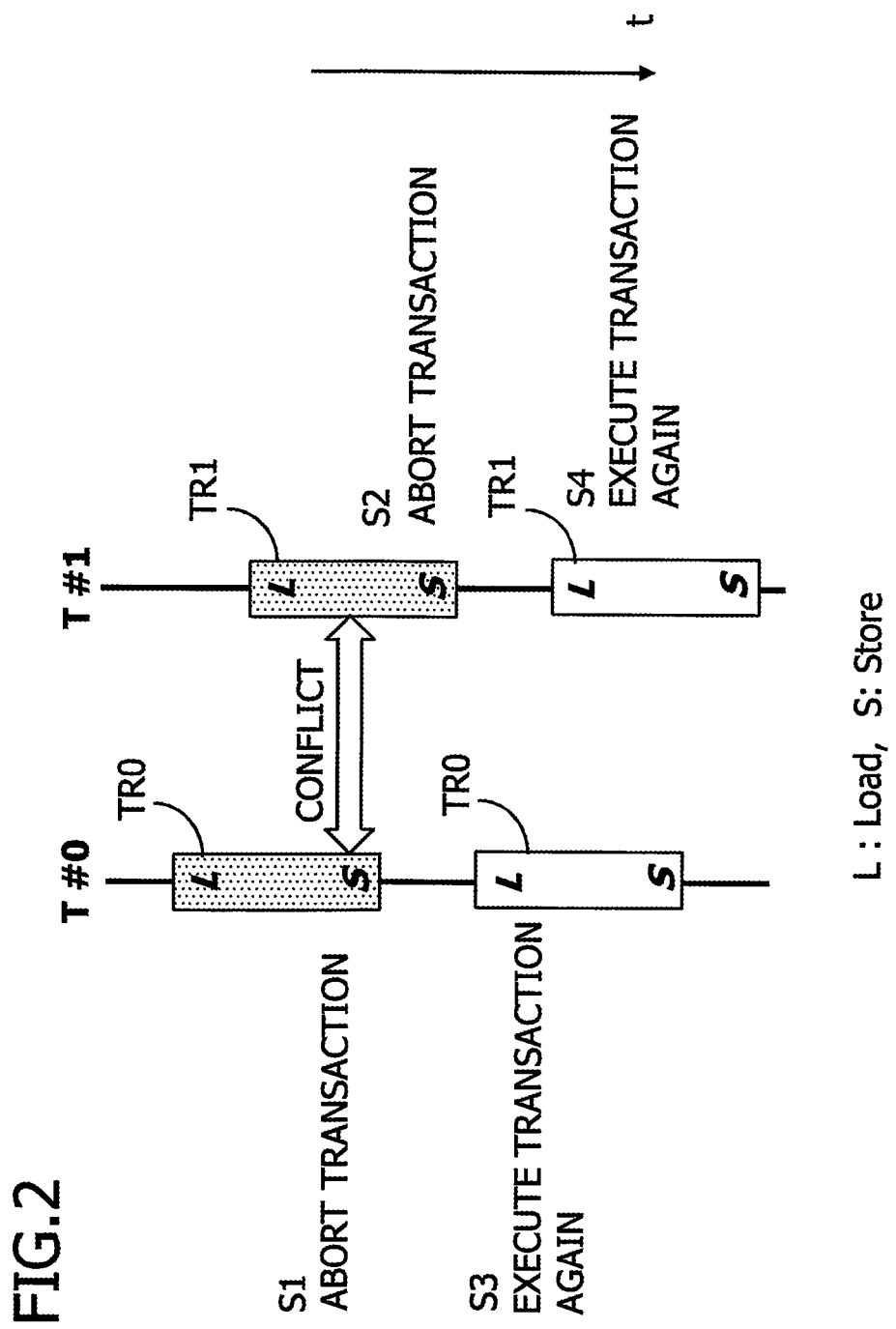
FIG. 2 is a diagram illustrating a first example of exclusive processing when transactions conflict with each other.

FIG. 2 is a diagram illustrating a first example of exclusive processing when transactions conflict with each other. In this example, threads T#0 and T#1 execute transactions TR0 and TR1 which involve accesses to a shared memory, respectively. In FIG. 2, time elapses in a directory from top to bottom on a time axis t. "L" in each transaction indicates a load instruction (memory read instruction) and "S" indicates a store instruction (memory write instruction) and each is the same transaction as illustrated in FIG. 1, for example. Moreover, the first transaction TR0 of the thread T#0 and the first transaction TR1 of the thread T#1 execute a write instruction to the same address and conflict with each other.

In this case, exclusive processing of FIG. 2 aborts both of the conflicting transactions TR0 and TR1 (S1 and S2). As a result of the aborting, the respective transactions are reset and cache memories which have been changed during the transaction are also invalidated. Moreover, both threads T#0 and T#1 executes the respective transactions TR0 and TR1 again at optional points in time (S3 and S4).

However, in the exclusive processing of FIG. 2, since both conflicting transactions are aborted, performance penalties due to the conflict are large. Moreover, transactions of a certain thread are repeatedly aborted, and consequently, deadlocks may occur.

Figure 3:
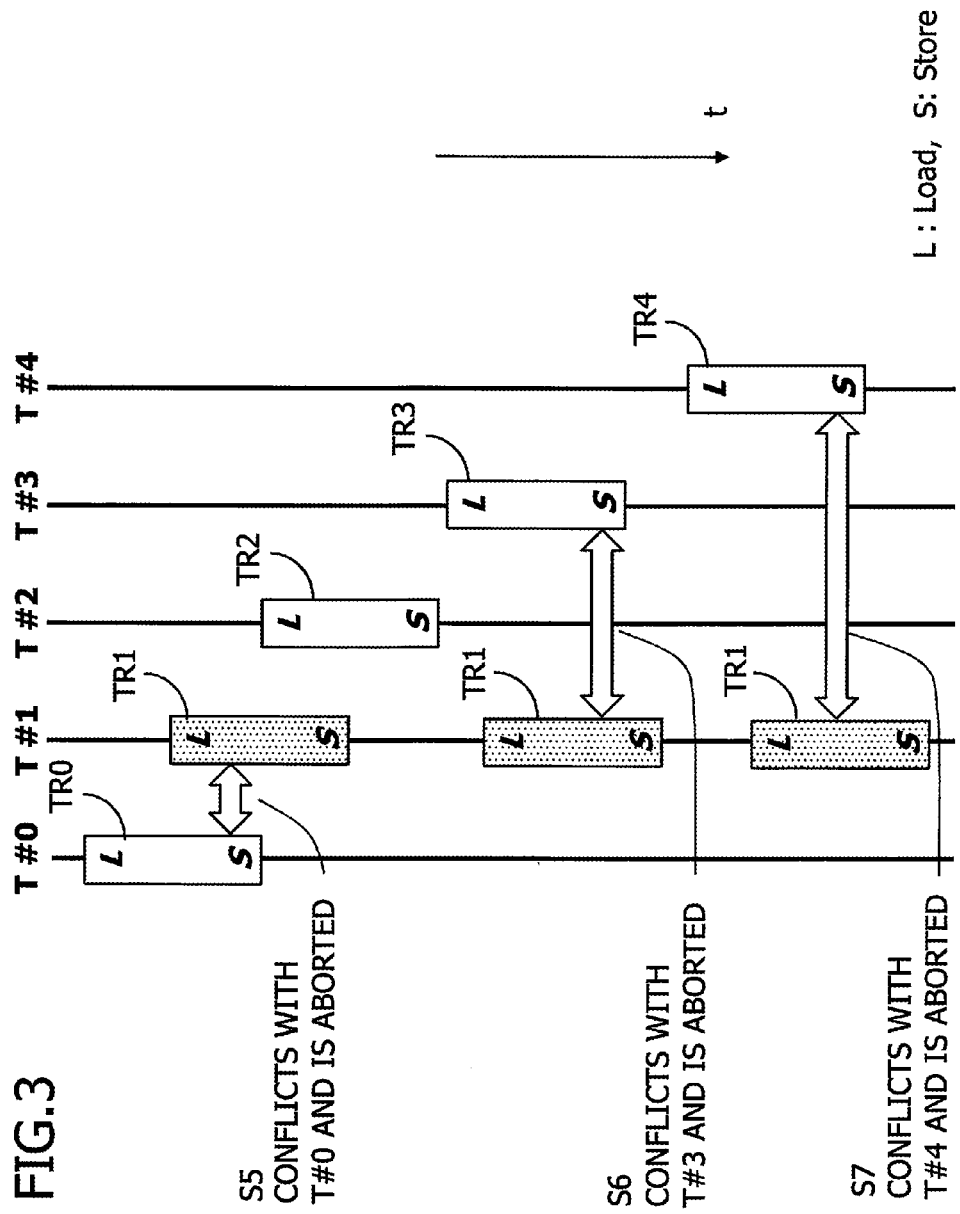
FIG. 3 is a diagram illustrating a second example of exclusive processing when transactions conflict with each other.

FIG. 3 is a diagram illustrating a second example of exclusive processing when transactions conflict with each other. In this example, five threads T#0 to T#4 execute transactions TR0 to TR4 which involve accesses to a shared memory, respectively. In the second example of exclusive processing, a transaction which has executed a store instruction earlier than conflicting transactions is executed continuously, and the other transactions are aborted. In exclusive processing based on such first-in-first-out (FIFO) policies, transactions of a certain threads are repeatedly aborted and is not able be executed.

In the example of FIG. 3, the transaction TR0 of the thread T#0 and the transaction TR1 of the thread T#1 conflict with each other, the transaction TR0 which has executed a store instruction earlier is executed continuously, and the transaction TR1 is aborted (S5). Further, the transaction TR1 of the thread T#1 and the transaction TR3 of the thread T#3 conflict with each other, the transaction TR3 which has executed a store instruction earlier is executed continuously, and the transaction TR1 is aborted (S6). Further, the transaction TR1 of the thread T#1 and the transaction TR4 of the thread T#4 conflict with each other, the transaction TR4 which has executed a store instruction earlier is executed continuously, and the transaction TR1 is aborted (S7). As a result, the transaction TR1 of the thread T#1 is repeatedly aborted, and consequently, the control jumps to a software abort handler and lock processing is performed.

In lock processing, as described above, the thread T#1 acquires a lock, transactions of other threads are put into a standby state, and the transaction TR1 of the thread T#1 executes a store instruction on a memory exclusively.

However, when a software abort handler is executed, all other transactions are put into a standby state and it is not possible to take advantage of a hardware transactional memory, which results in a large decrease in performance.

The first and second examples of exclusive processing described referring to FIGS. 2 and 3 are examples of a hardware transactional memory, and are not always a prior art. In these exclusive processing examples, since determination of exclusive processing in the event of conflicts is simple, the exclusive processing are easily implemented as a hardware transactional memory. However, transactions of a certain thread may be aborted repeatedly, which is not desirable.

First Embodiment

Figure 4:
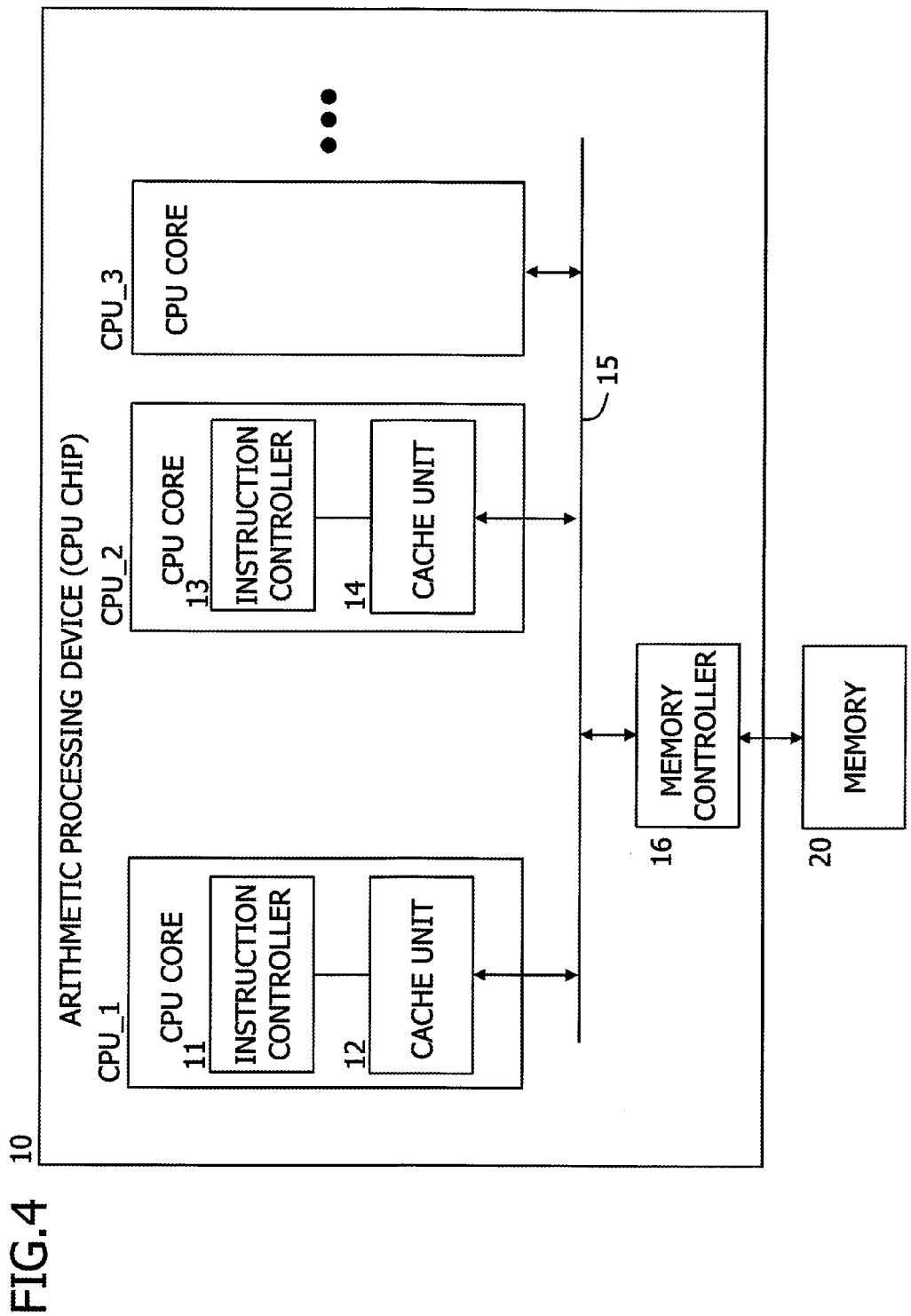
FIG. 4 is a diagram illustrating an arithmetic processing device according to a first embodiment.

FIG. 4 is a diagram illustrating an arithmetic processing device according to a first embodiment. An arithmetic processing device 10 is a CPU chip, for example, and includes a plurality of CPU cores CPU_1 to CPU_3, a memory controller 16, and a bus 15. Moreover, the arithmetic processing device 10 is connected so as to be accessible to a main memory 20.

The CPU core CPU_1 includes an instruction controller 11 having an instruction execution pipeline, an arithmetic logic unit (ALU), and the like and a cache unit 12. The cache unit 12 includes a cache memory, a cache pipeline circuit that controls the cache memory, and the like, for example. The cache unit 12 may be configured to include a L1 cache unit and a L2 cache unit. The CPU core CPU_2 similarly includes an instruction controller 13 and a cache unit 14. The other CPU core CPU_3 and the like similarly have an instruction controller and a cache unit.

In the case of the arithmetic processing device 10 illustrated in FIG. 4, since a plurality of CPU cores shares the memory 20, a configuration for maintaining cache coherency may be needed. For example, when the cache units of a plurality of CPU cores are holding the same cache block, a CPU core that executes a store instruction to perform a write operation requests to invalidate cache blocks of other CPU cores.

Figure 5:
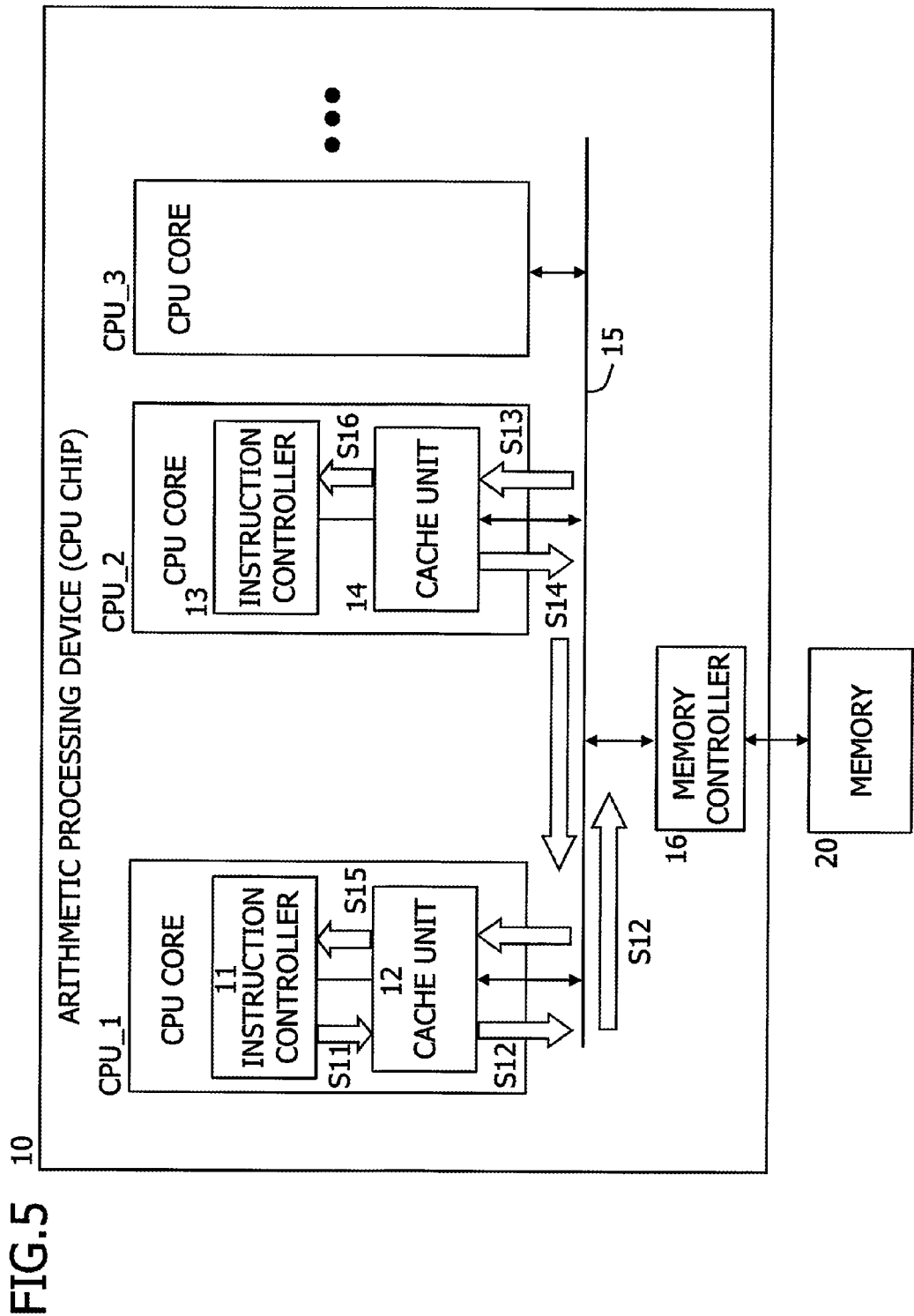
FIG. 5 is a diagram illustrating an overview of exclusive processing according to the present embodiment.
Figure 6:
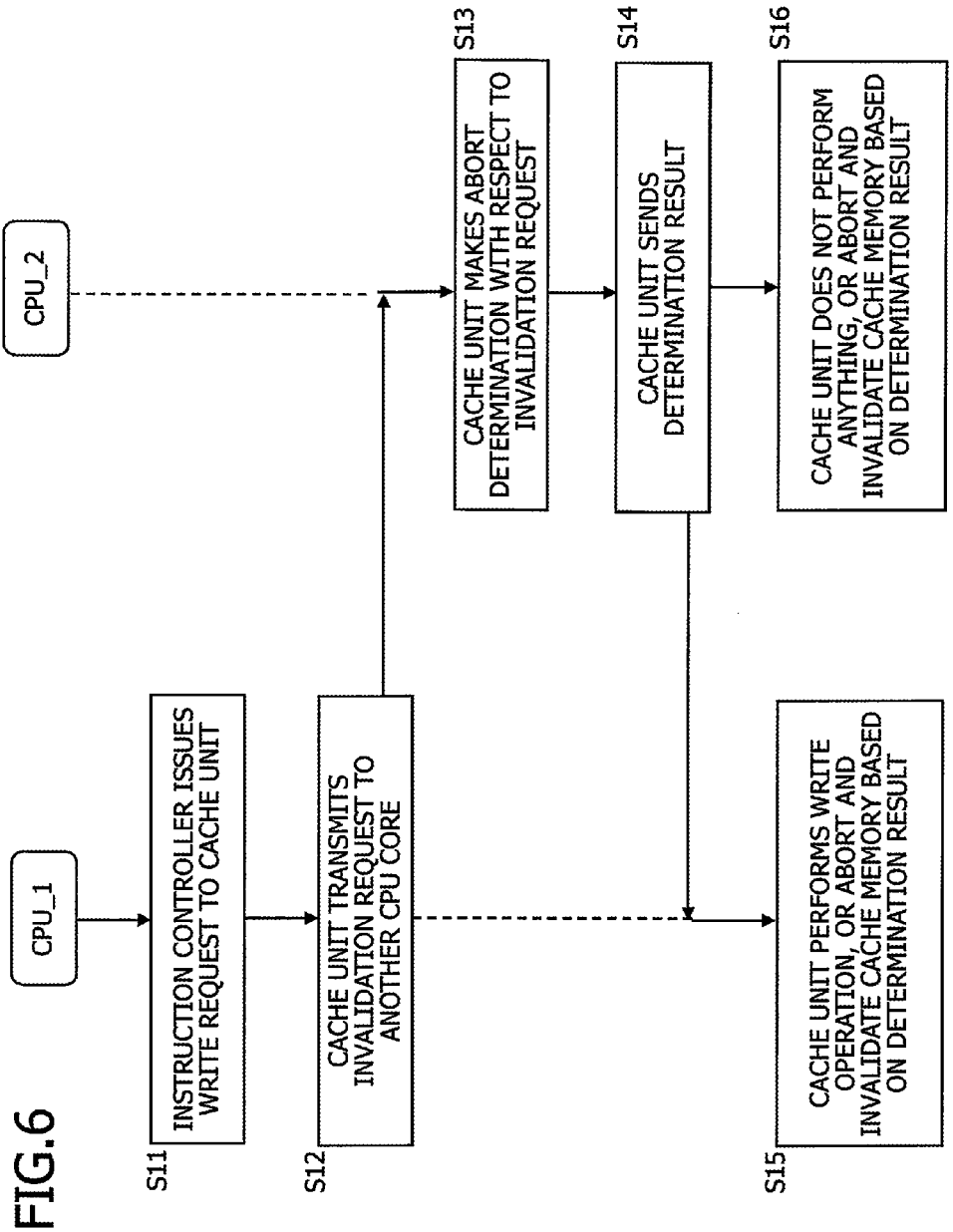
FIG. 6 is a diagram illustrating an overview of exclusive processing according to the present embodiment.

FIGS. 5 and 6 are diagrams illustrating an overview of exclusive processing according to the present embodiment. For example, it is assumed that, when the CPU core CPU_1 is executing a first transaction which involves such a memory access as illustrated in FIG. 1, the instruction controller 11 of the CPU core CPU_1 issues a write request to the cache unit 12.

First, the instruction controller 11 of the CPU core CPU_1 issues a write request to the cache unit 12 (S11). The write request is to write a data to the main memory 20 via the cache unit 12. In response to this, the cache unit 12 transmits an invalidation request to invalidate a cache block corresponding to the write request to another CPU core CPU_2 (S12). The invalidation request is received by the cache unit 14 in the CPU core CPU_2 via the bus 15. The invalidation request includes an ID of a source CPU core, information indicating a transaction state of the source CPU core, an access address, and the like, for example.

The cache unit 14 of the CPU core CPU_2 executes abort determination on the invalidation request (S13). In the abort determination, first, the cache unit 14 determines whether a second transaction being executed by the CPU core CPU_2 conflicts with a cache block corresponding to an access address included in the invalidation request. Moreover, when a conflict occurs, the cache unit 14 determines whether the second transaction is to be aborted based on the information included in the invalidation request (for example, state information of the source CPU core or the like). A circuit for making this determination is configured according to a predetermined determination logic which will be described later.

When it is determined that the second transaction is not to be aborted, the cache unit 14 of the CPU core CPU_2 validates an abort request bit for requesting abortion of the first transaction and sends the abort request bit, as the determination result, to the CPU core CPU_1 which is the source of the invalidation request (S14). On the other hand, when it is determined that the second transaction is to be aborted, the cache unit 14 invalidates the abort request bit (makes abortion unneeded) and sends the abort request bit as the determination result (S14). Even when the second transaction does not conflict with the cache block, the cache unit 14 invalidates the abort request bit (makes abortion unneeded) and sends the abort request bit as the determination result (S14).

In response to the determination result, the cache unit 12 of the CPU core CPU_1 executes a write request of the first transaction and rewrites data of the cache block when the determination result indicates that the second transaction is to be aborted and therefore the abort request bit is invalid. The same is true when the determination result indicates that the transaction does not conflict with the cache block. Moreover, when the determination result indicates that the second transaction is not to be aborted and the abort request bit is valid, the cache unit 12 causes the instruction controller 11 to abort the first transaction and invalidates the cache block changed by the first transaction (S15).

On the other hand, when the determination result indicates that the second transaction is not to be aborted, the cache unit 14 of the CPU core CPU_2 does not perform any particular operation. The same is true when the determination result indicates that the transaction does not conflict with the cache block. On the other hand, when the determination result indicates that the second transaction is to be aborted, the cache unit 14 causes the instruction controller 13 to abort the second transaction and invalidates the cache block changed by the second transaction (S16).

In this manner, in the first embodiment, when an instruction controller in a first CPU core issues a write request in association with execution of a store instruction within a first transaction in execution, an invalidation request is transmitted to another second CPU core in order to maintain cache coherency. The second CPU core having received the invalidation request determines whether a second transaction being executed by the second CPU core conflicts with a cache block corresponding to a destination of the write request and determines whether the second transaction in execution is to be aborted based on a predetermined abort determination logic when the second transaction conflicts with the cache block. That is, the second CPU core having received the invalidation request makes abort determination by comparing the states of the first and second transactions, for example, based on a predetermined determination logic rather than aborting the second conflicting transaction unconditionally.

Moreover, based on the determination result, the first and second CPU cores abort a transaction that is determined to be aborted and invalidate the cache block changed by the aborted transaction. A transaction is aborted by causing a program counter to jump to the starting address of the transaction, for example. Moreover, the cache block is invalidated by invalidating a valid bit of a cache tag of a cache block on which a read or write operation is performed during the transaction aborted, for example.

By employing such a determination logic that prevents a situation where a specific transaction is repeatedly aborted, as a logic for determining abortion of conflicting transactions, it is possible to obviate deterioration in the performance of transactional memories described with reference to FIGS. 2 and 3.

As described above, with an invalidation request for maintaining cache coherency used as a trigger, by causing a CPU core having received the invalidation request to determine whether a transaction is to be aborted, it is possible to mediate conflicting memory accesses according to a desired logic in hardware transactional memories.

Second Embodiment

Figure 7:
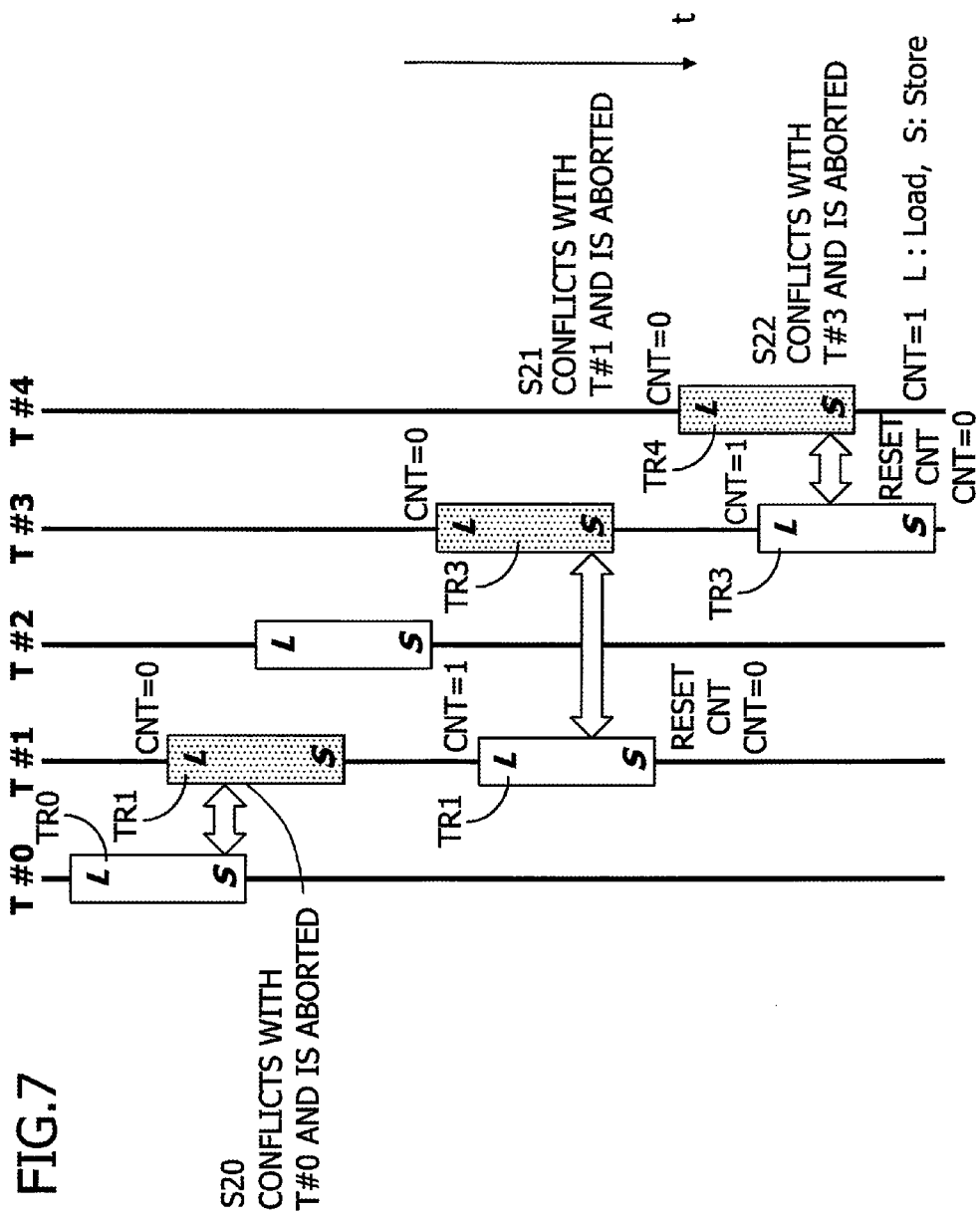
FIG. 7 is a diagram illustrating exclusive processing according to a second embodiment.

FIG. 7 is a diagram illustrating exclusive processing according to a second embodiment. The second embodiment has the same configuration as the arithmetic processing device described with reference to FIGS. 4, 5, and 6 and transmits an invalidation request for exclusive processing and performs abort determination. Moreover, in the second embodiment, a logic in which a transaction of which the abort count is larger than that of other transactions is executed continuously and a transaction of which the abort count is smaller is aborted is employed as an abort determination logic. That is, the larger the abort count of a transaction, the higher priority of execution is given to the transaction.

Exclusive processing according to the second embodiment will be described with reference to FIG. 7. In FIG. 7, five threads T#0 to T#4 execute respective transactions similarly to FIG. 3. In the second embodiment, each CPU core has an abort counter that counts an abort count for each thread. Moreover, an abort count during a transaction of a thread is counted by the abort counter. Moreover, when memory accesses of transactions conflict with each other, respective abort counts are compared, a transaction having the smaller abort count is aborted, and a transaction having the larger abort counter is executed continuously. When a transaction is completed, the abort counter is reset.

Referring to the example of FIG. 7, when the transaction TR0 of the thread T#0 conflicts with the transaction TR1 of the thread T#1 and the transaction TR1 is aborted (S20), the abort count CNT of the abort counter of the thread T#1 is counted up from CNT=0 to CNT=1. After that, when the transaction TR1 of the thread T#1 conflicts with the transaction TR3 of the thread T#3, since the abort count CNT of the thread T#3 is CNT=0, the transaction TR3 having the smaller abort count is aborted and the transaction TR1 is executed continuously regardless of the fact that the store instruction S of the transaction TR1 is later than the store instruction S of the transaction TR3 (S21). In this case, the abort count CNT of the thread T#3 is counted up to CNT=1. After that, when the thread T#1 completes a transaction without conflicting with another thread, the abort count CNT of the thread T#1 is reset to CNT=0.

Subsequently, when the transaction TR3 of the thread T#3 is executed again and conflicts with the transaction TR4 of the thread T#4, the transaction TR4 having the smaller abort count is aborted and the transaction TR3 is executed continuously (S22). As a result, the abort count CNT of the thread T#3 is reset to CNT=0 when the transaction is completed, and the abort count CNT of the thread T#4 is counted up to CNT=1.

In this manner, by comparing abort counts to determine which transaction is to be aborted, it is possible to obviate a situation in which a transaction of a specific thread is aborted repeatedly, a software abort handler is executed, and consequently, performance deteriorates.

Next, an example in which the abort determination logic of the second embodiment is applied to the exclusive processing according to the first embodiment will be described.

Figure 8:
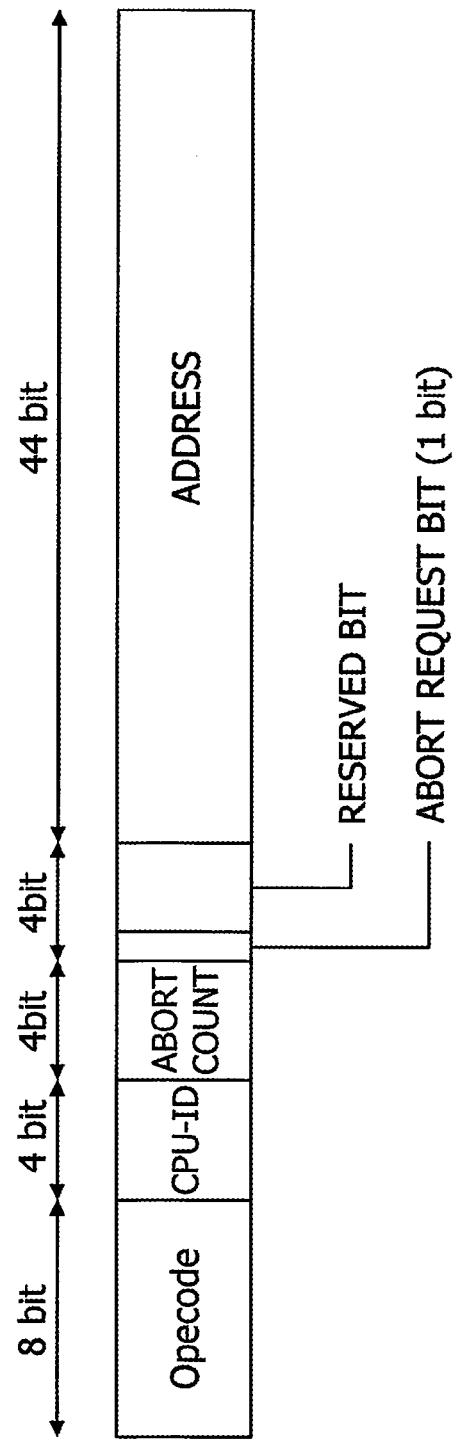
FIG. 8 is a diagram illustrating an example of the format of an invalidation request which is a cache coherency transaction between CPU cores according to the second embodiment.

FIG. 8 is a diagram illustrating an example of the format of an invalidation request which is a cache coherency transaction between CPU cores according to the second embodiment. The invalidation request is made up of 64 bits which include an 8-bit operation code, a 4-bit source CPU core ID, a 4-bit source CPU core abort count, a 1-bit abort request bit (corresponding to an abort determination result), a 3-bit reserved bit, and a 44-bit access destination address.

Figure 9:
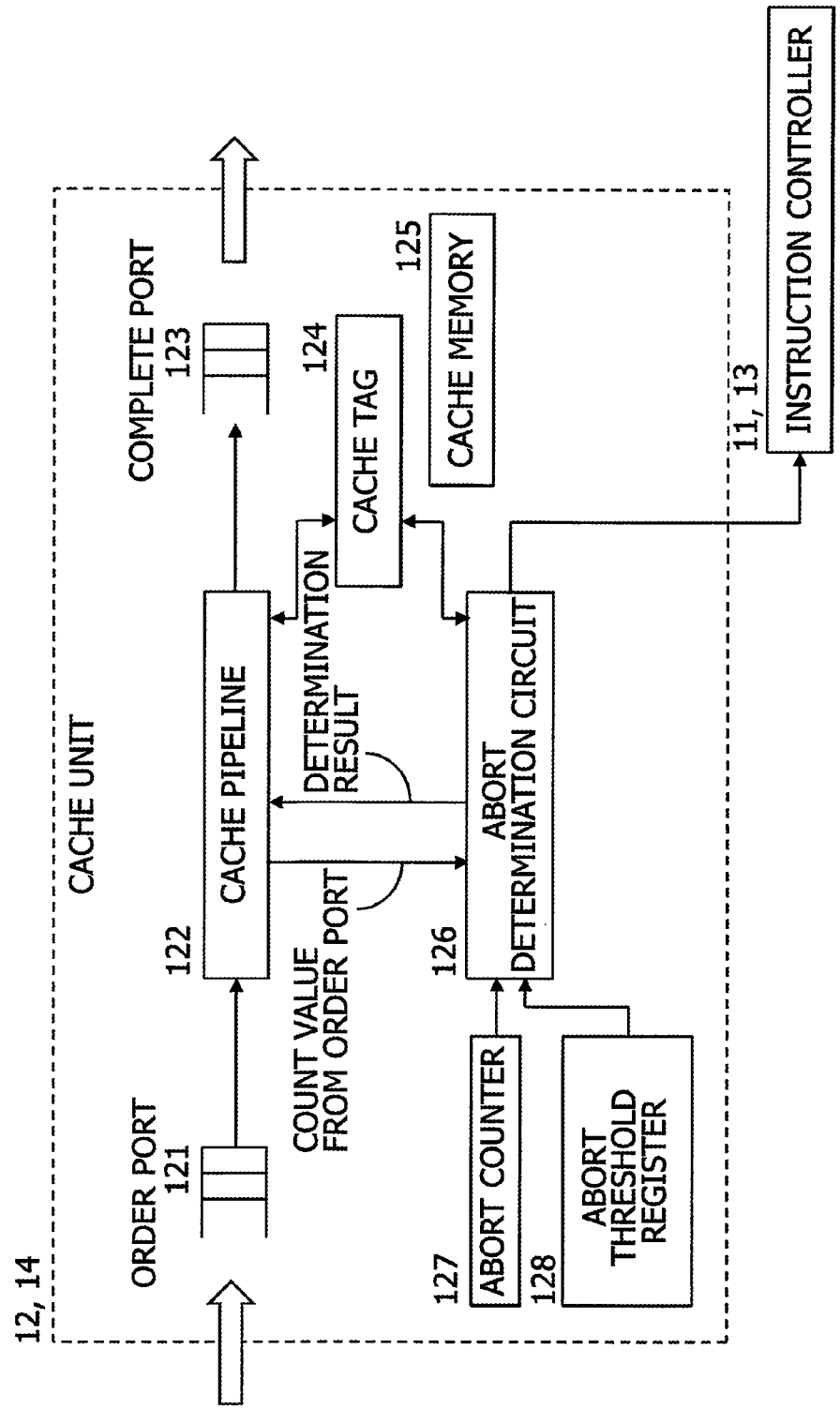
FIG. 9 is a diagram illustrating a cache unit in a CPU core according to the second embodiment.

FIG. 9 is a diagram illustrating a cache unit in a CPU core according to the second embodiment. Cache units 12 and 14 each includes an order port 121 that receives invalidation requests from different CPU cores and requests from the instruction controllers 11 and 13 in the same CPU core, a cache pipeline 122 that processes the request received by the order port, and a complete port 123 that receives a response and the like to a request.

Moreover, the cache unit 12 and 14 each includes a cache tag 124 that stores the address of a memory corresponding to a cache block and a cache memory 125 that stores cached data in respective cache block units.

In the second embodiment, the cache units 12 and 14 each includes an abort determination circuit 126 that determines whether a transaction in execution conflicts with an invalidation request from another CPU core and determines whether the transaction is to be aborted when the transaction conflicts with the invalidation request, and an abort counter 127 that counts an abort count of the transaction in execution.

Further, the cache unit includes an abort threshold register 128. The abort threshold register is provided so as to be able to jump to a software abort handler exceptionally when the abort count has increased up to the abort threshold, which will be described later. That is, the cache unit performs exceptional processing when the abort count has increased to the abort threshold exceptionally even if aborts are mediated based on the abort count.

Figure 10:
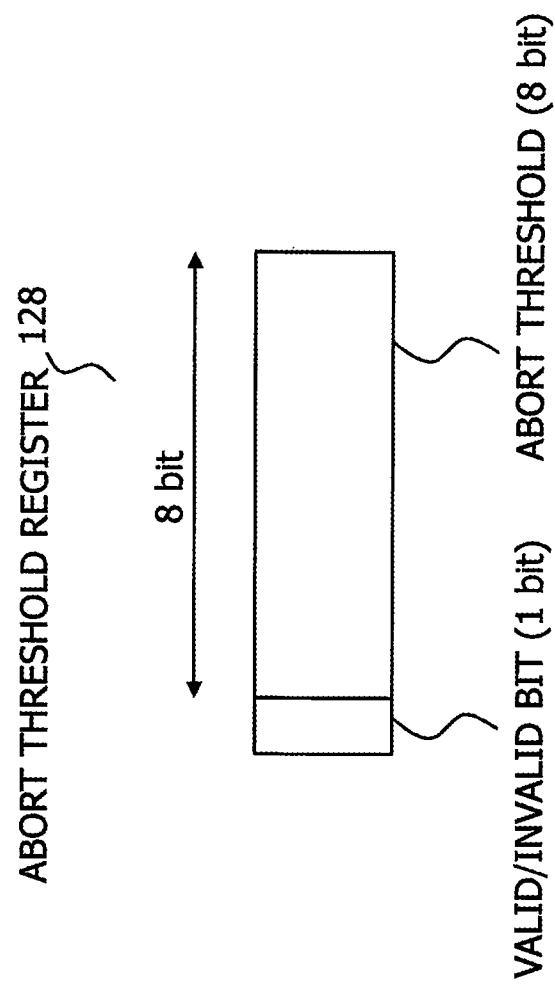
FIG. 10 is a diagram illustrating a configuration of the abort threshold register 128.

FIG. 10 is a diagram illustrating a configuration of the abort threshold register 128. The abort threshold register 128 has an area for storing an 8-bit abort threshold and an area for storing a 1-bit valid/invalid bit indicating whether the abort threshold is valid or not. When the valid/invalid bit is invalid and an abort occurs, processing is performed immediately by a software abort handler and a hardware retry is not performed. When the valid/invalid bit is valid, a hardware retry is performed until the abort handler reaches the abort threshold, and processing is performed by a software abort handler when the abort count reaches the abort threshold.

FIG. 11 is a diagram illustrating a configuration of the cache tag 124. The cache tag 124 has a tag address TAG_ADDRESS, a valid bit V thereof, and a read flag R and a write flag W indicating that read and write operations have been executed within a transaction in execution, respectively. In the example illustrated in FIG. 11, all of the three lines of cache tags are valid, a read operation has been executed on cache blocks corresponding to the cache tags on the first and third lines, and a write operation has been executed on a cache block corresponding to a cache tag on the second line.

Figure 12:
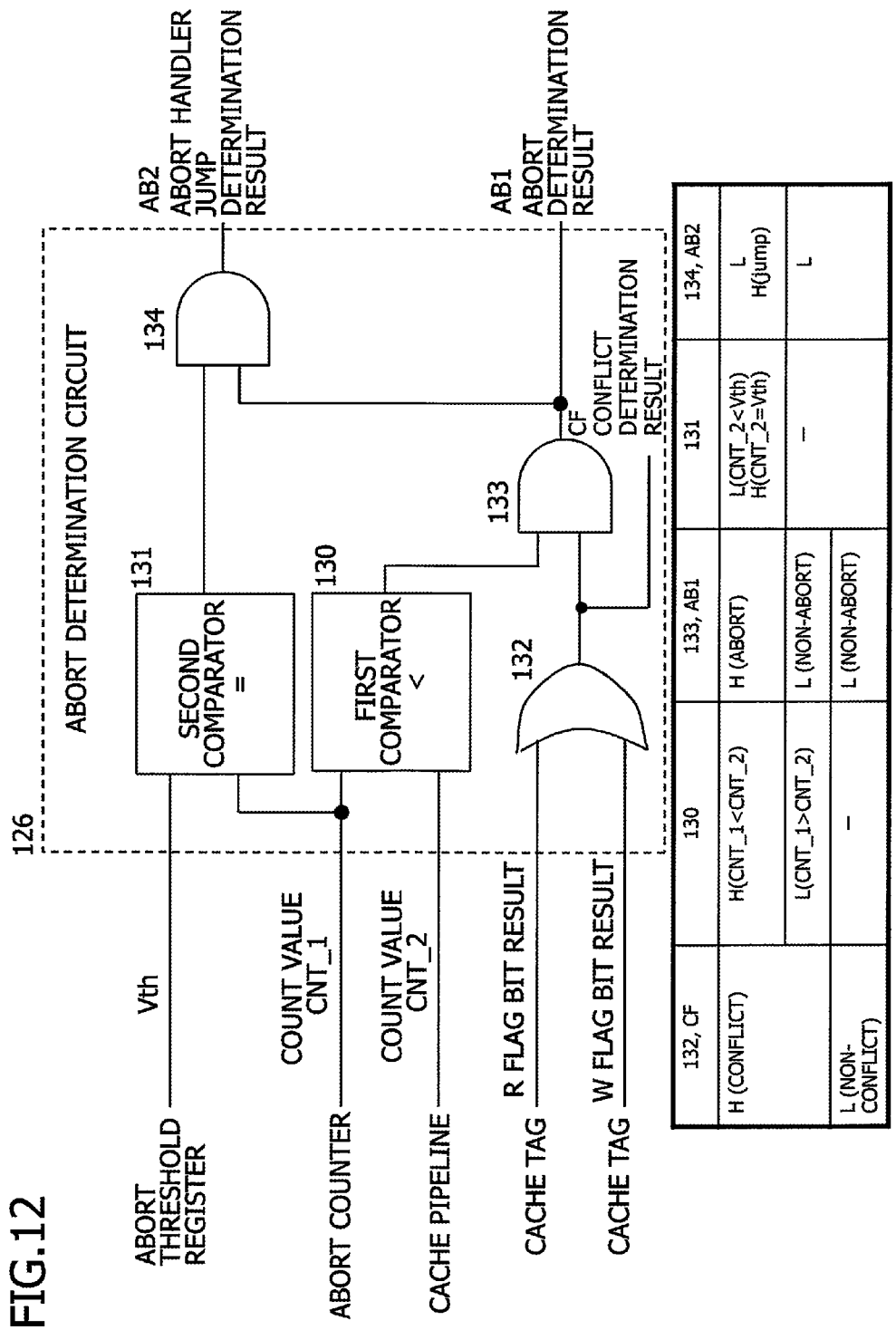
FIG. 12 is a diagram illustrating a configuration of an abort determination circuit.

FIG. 12 is a diagram illustrating a configuration of an abort determination circuit. FIG. 12 also illustrates a table of logical values indicating the operations of the abort determination circuit. The abort determination circuit 126 includes a first comparator 130 that compares an abort count CNT_1 of the abort counter 127 with an abort count CNT_2 of the invalidation request from another CPU core, transmitted from the cache pipeline 122, and outputs an H-level signal when the abort count CNT_1 of the abort counter 127 is smaller and an L-level signal when the abort count CNT_1 is larger. Further, the abort determination circuit 126 includes an OR gate 132 for detecting a state (1 or H-level) where any one of the read flag R and the write flag W of a tag address has been executed for an access address of the invalidation request within the cache tag 124, therefore a transaction conflicting state. Moreover, the abort determination circuit 126 includes a logic gate 133 that outputs an abort determination result AB1 indicating abort execution (H-level) that a subject transaction in execution is to be aborted when both outputs of the first comparator 130 and the OR gate 132 are H-level and outputs an abort determination result AB1 indicating abort non-execution (L-level) when at least one of the outputs of the first comparator 130 and the OR gate 132 is L-level.

Further, the abort determination circuit 126 includes a second comparator 131 that determines whether the abort count CNT_1 of the abort counter is identical to the threshold Vth of the abort threshold register and a logic gate 134 that receives the output of the second comparator 131 and the output of the logic gate 133 and outputs an abort handler jump determination result AB2. Moreover, the output of the OR gate 132 that detects a transaction conflict as a conflict determination result CF.

In the cache unit having the above-described configuration, in response to the invalidation request received from another CPU core, the cache pipeline 122 transmits an abort count CNT_2 of a transaction of the invalidation request received via the order port 121 to the abort determination circuit 126 in order to cause the abort determination circuit 126 to execute abort determination. The abort determination circuit 126 causes the OR gate 132 to determine whether a first transaction being executed by a CPU core having transmitted the invalidation request conflicts with a second transaction being executed by a CPU core having received the invalidation request, based on the read flag R and the write flag W of the cache tag. That is, the cache pipeline 122 reads the R flag and the W flag of the cache block of which the address in the transaction of the invalidation request illustrated in FIG. 8 is identical to the address tag of the cache tag 124 and transmits the flags to the abort determination circuit 126. Since the R flag and the W flag are in the reset state when transactions are started, if the R flag or the W flag are set to "1," it means that the cache block has been changed during the transaction in execution (that is, the cache block has been cached from a memory). Thus, when the conflict determination result CF of the output of the OR gate 132 is H-level, it means that transactions conflict with each other.

Further, in the abort determination circuit 126, the first comparator 130 compares the abort count CNT_2 of the invalidation request and the abort count CNT_1 of the abort counter 127 and outputs an H-level signal when the abort count CNT_1 of the abort counter 127 is smaller than the received abort count CNT_2 or an L-level signal when the abort count CNT_1 is larger. When the transactions conflict with each other (CF=H) and the first comparator 130 outputs an H-level signal (CNT_1<CNT_2), the logic gate 133 outputs an abort determination result AB1 (H-level) indicating that a transaction in execution is to be aborted. When the first comparator 130 outputs an L-level signal (CNT_1>CNT_2), the logic gate 133 outputs an abort determination result AB1 (L-level) indicating that a transaction in execution is not to be aborted. On the other hand, when the transactions do not conflict with each other (CF=L), the logic gate 133 also outputs an L-level abort determination result AB1. Moreover, the abort determination circuit 126 sends the abort determination result AB1 and the conflict determination result CF to the cache pipeline 122.

(1) When it is determined that the second transaction in execution by CPU_2 is to be aborted (AB1=H), the instruction controller 13 resets the second transaction in execution to jump a program counter to the starting address of the transaction, and the cache pipeline 122 invalidates tags of the cache block in the cache tag 124 changed during the aborted second transaction. The cache block changed during the second transaction is detected by checking whether the R flag or the W flag is set to "1". In this case, the cache pipeline 122 sets the abort request bit within the replying transaction illustrated in FIG. 8 to "0" (invalid) indicating that an abort request is not to be sent to another CPU core CPU_1.

(2) On the other hand, when it is determined that the conflicting second transaction in execution by CPU_2 is to be executed continuously without being aborted (CF=H and AB1=L), the instruction controller 13 executes the second transaction in execution continuously. In this case, the cache pipeline 122 sets the abort request bit within the replying transaction illustrated in FIG. 8 to "1" (valid) indicating that an abort request is to be sent to another CPU core CPU_1.

(3) When it is determined that transactions in execution do not conflict with each other (CF=L), both instruction controllers 11 and 13 execute transactions in execution continuously. In this case, the cache pipeline 122 sets the abort request bit within the replying transaction illustrated in FIG. 8 to "0" (invalid) indicating that an abort request is not to be sent to another CPU core CPU_1. That is, both CPU cores execute transactions in execution continuously.

Moreover, the cache pipeline 122 sends a transaction in response to the invalidation request to another CPU core CPU_1 via the complete port 123.

In the abort determination circuit 126, the second comparator 131 outputs an H-level signal when the abort count CNT_1 of the abort counter becomes identical to the abort threshold Vth. Moreover, when the logic gate 133 determines that abort is to be performed (H-level), the logic gate 134 requests the instruction controller 13 to jump to the abort handler by outputting an H-level abort handler jump determination result AB2. When the abort count CNT_1 has not reached the abort threshold Vth, the second comparator 131 output L-level, and the jump determination result AB2 on jumping to the abort handler is in the L-level.

When the abort handler jump determination result AB2 is H-level, the instruction controller 13 aborts the second transaction in execution and jumps to a software abort handler. In this way, a lock is acquired forcibly and the second transaction is executed.

Figure 13:
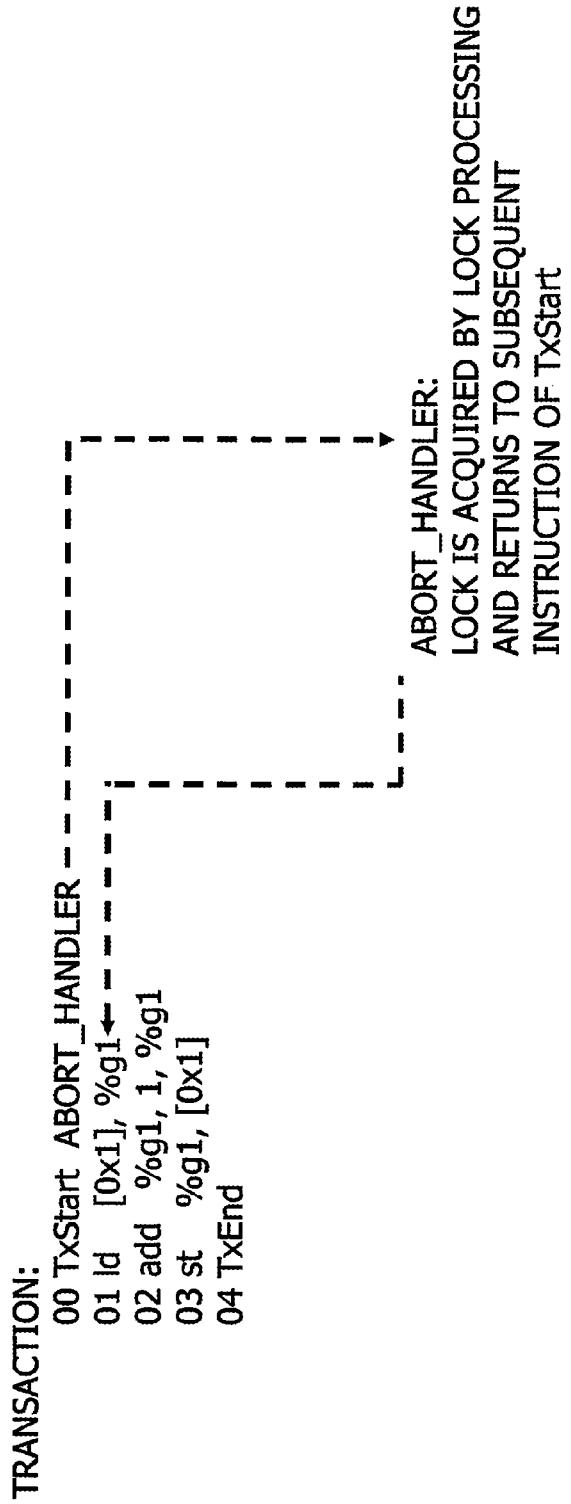
FIG. 13 is a program example of a transaction that describes a jump destination of an abort handler.

FIG. 13 is a program example of a transaction that describes a jump destination of an abort handler. A jump destination address of an abort handler is described in an operand field of a start instruction TxStart at Address 00 of a transaction. The abort handler at the jump destination acquires a lock to return to Address 01, and the subsequent instructions of the transaction are executed.

The first comparator 130 may be designed so as to output an H-level signal to abort a transaction or an L-level signal not to abort a transaction when the abort count CNT_1 of the abort counter is identical to the abort count CNT_2 of the invalidation request.

As described above, according to the second embodiment, the abort count of a transaction is stored in an abort counter, and a first CPU core transmits an invalidation request to another CPU core (that is, a second CPU core) by including the subject abort count in the invalidation request when executing a write instruction. The abort determination circuit of the second CPU core determines whether transactions conflict with each other. When the transactions conflict with each other, an abort count of a first transaction in the invalidation request is compared with the abort count of a second transaction in the abort counter to determine which one of the first and second transactions of the first and second CPU cores is to be aborted. In this manner, by storing such state information of a transaction like the abort count in the transaction of the invalidation request, the CPU core having received the invalidation request determines which CPU core aborts transaction in execution based on the state information of the transaction.

Third Embodiment

In a third embodiment, an abort determination circuit executes abort determination using the execution time-related information of a transaction as the state information of a transaction. Examples of the execution time-related information of a transaction include an execution time which is an actual elapsed time (μsec) after the start of execution of a transaction, the number of clock cycles after the start of execution of a transaction, and the number of instructions of a program executed from the start of execution of a transaction.

The third embodiment has the same configuration as the arithmetic processing device described with reference to FIGS. 4, 5, and 6 and transmits an invalidation request for exclusive processing and performs abort determination. Moreover, in the third embodiment, an abort determination logic in which a transaction of which the execution time-related information such as an execution time of a conflicting transaction, the number of clocks, or the number of program steps is shorter or smaller is aborted and a transaction of which the execution time-related information is longer or larger is executed continuously, is employed as an abort determination logic.

Figure 14:
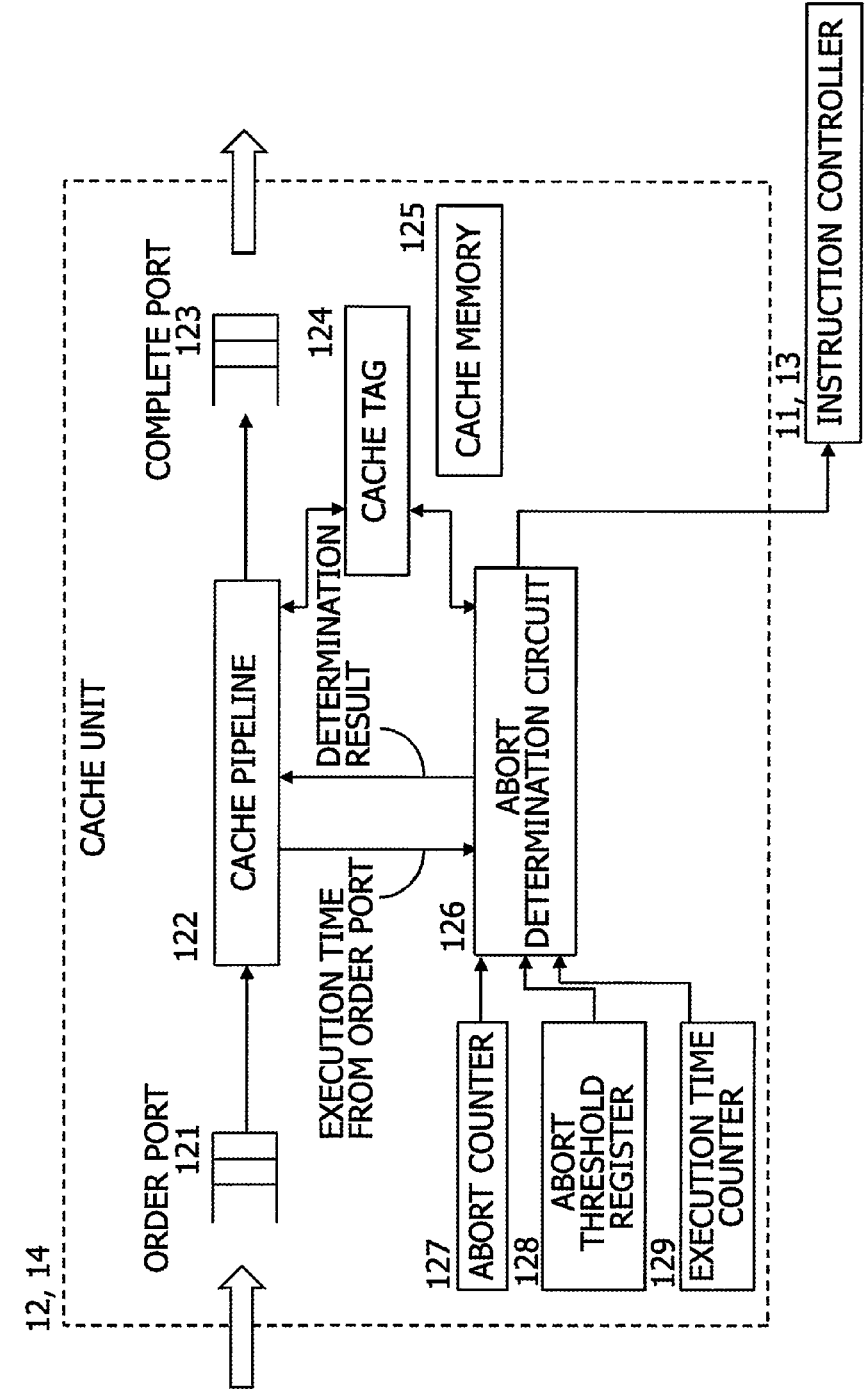
FIG. 14 is a diagram illustrating a configuration of cache units 12 and 14 according to the third embodiment.

FIG. 14 is a diagram illustrating a configuration of cache units 12 and 14 according to the third embodiment. The cache unit illustrated in FIG. 14 is different from the cache unit illustrated in FIG. 9 in that an execution time counter 129 that counts execution time-related information is included, and the abort determination circuit 126 performs advert determination based on an execution time count. The other constituent components are the same as those of FIGS. 9 to 11.

Figure 15:
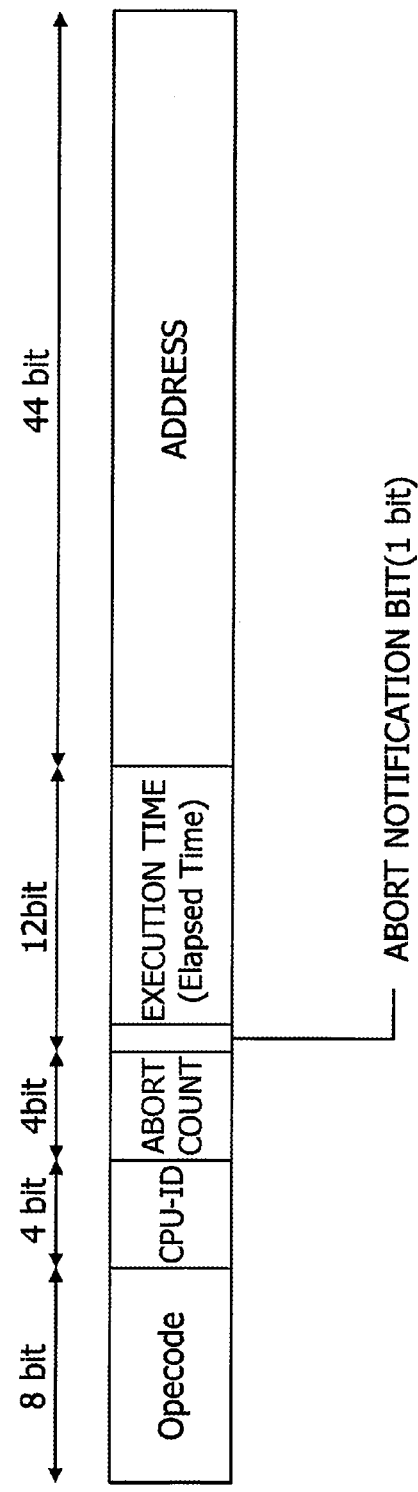
FIG. 15 is a diagram illustrating the format of a transaction of an invalidation request according to the third embodiment.

FIG. 15 is a diagram illustrating the format of a transaction of an invalidation request according to the third embodiment. This format is different from the format illustrated in FIG. 8 in that the invalidation request includes 11-bit execution time-related information. The others are the same as the format illustrated in FIG. 8. In the format illustrated in FIG. 15, the abort count may be omitted.

Figure 16:
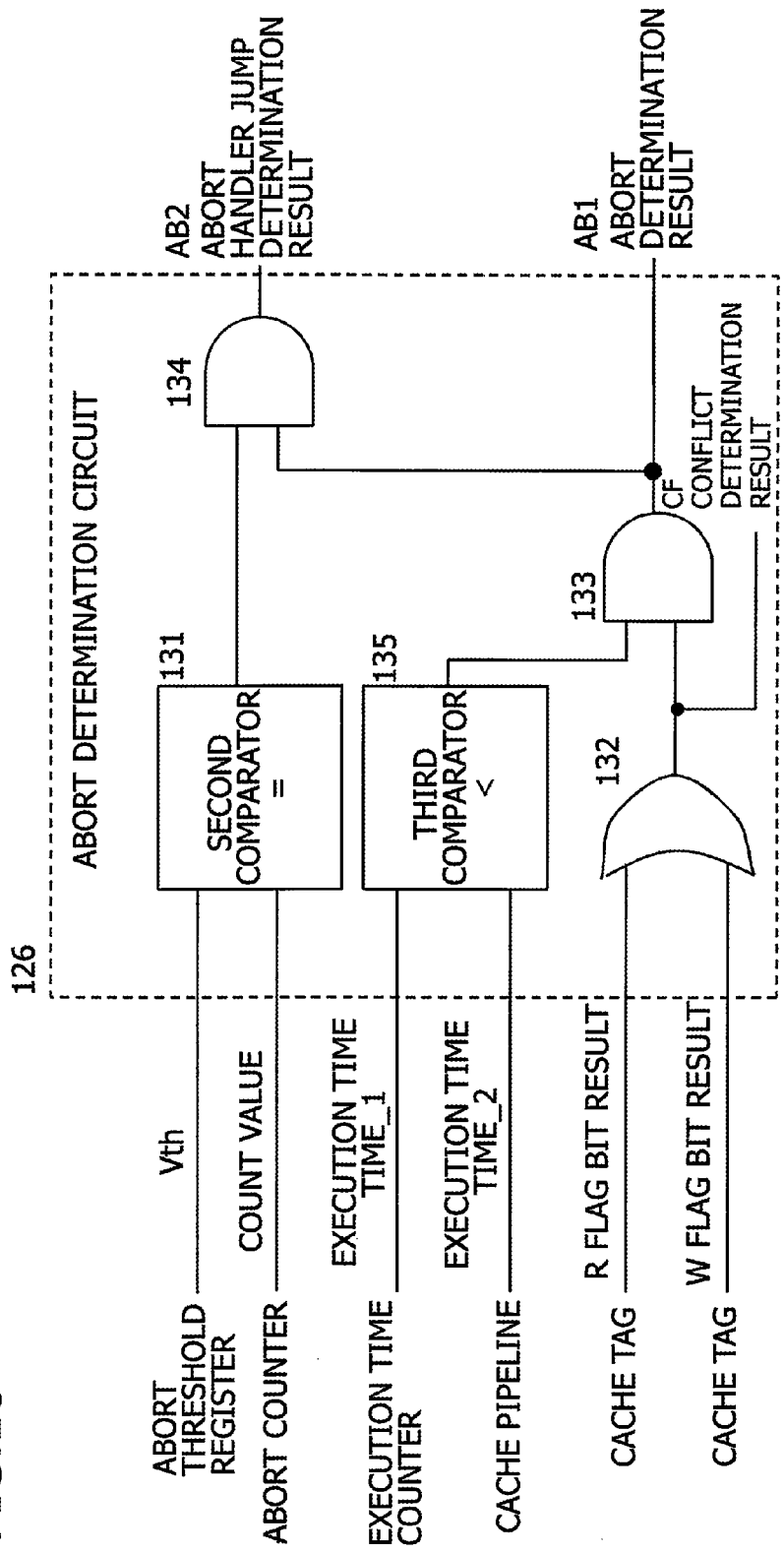
FIG. 16 is a diagram illustrating an abort determination circuit 126 according to the third embodiment.

FIG. 16 is a diagram illustrating an abort determination circuit 126 according to the third embodiment. The abort determination circuit 126 includes a third comparator 135 that compares an execution time TIME_1 of an execution time counter and an execution time TIME_2 included in the invalidation request instead of the first comparator 130 of the abort determination circuit illustrated in FIG. 12. The other constituent components are the same as those of FIG. 12. Moreover, the logical value table is the same as that of FIG. 12.

The third comparator 135 outputs an H-level signal when TIME_1<TIME_2 to allow the logic gate 133 to output an H-level abort determination result AB1 when transactions conflict with each other (CF=H) to abort a subject transaction (that is, a second transaction).

On the other hand, the third comparator 135 outputs an L-level signal when TIME_1>TIME_2 to allow the logic gate 133 to output an L-level abort determination result AB1 to abort a counterpart transaction (that is, a first transaction).

Further, when transactions do not conflict with each other, an L-level conflict determination result CF indicating non-conflicts is output and an L-level abort determination result AB1 indicating non-abortion is output.

In the third embodiment too, the cache units 12 and 14 includes the abort counter 127 and the abort threshold register 128, and the abort determination circuit 126 outputs an H-level abort handler jump determination result AB2 indicating a jump to the abort handler when the abort count has reached the abort threshold and an abort is performed again. This is the same as the second embodiment.

Fourth Embodiment

Figure 17:
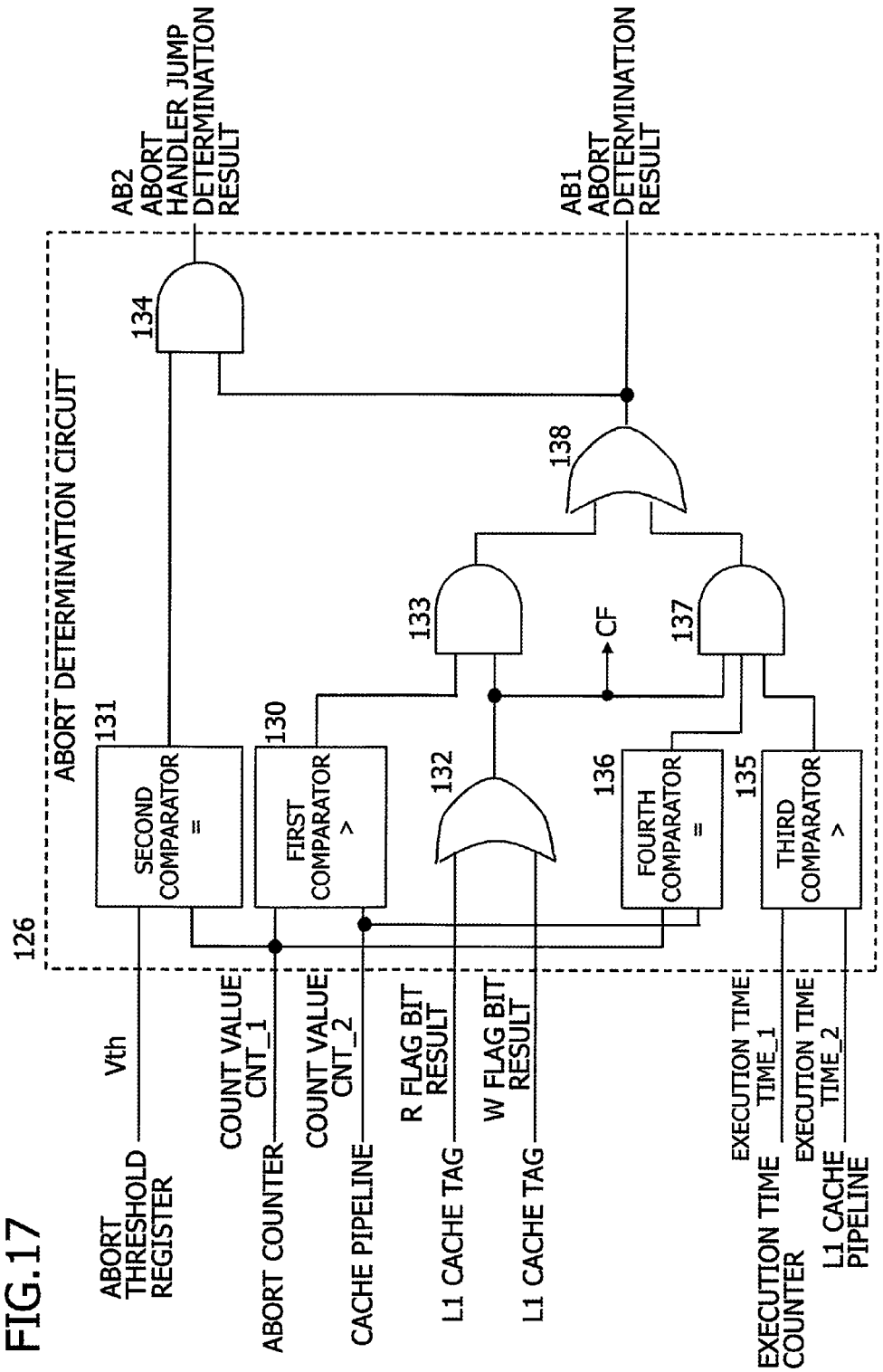
FIG. 17 is a diagram illustrating an abort determination circuit according to a fourth embodiment.

FIG. 17 is a diagram illustrating an abort determination circuit according to a fourth embodiment. In the fourth embodiment, abort counts are compared and a transaction having the smaller abort count is aborted similarly to the second embodiment. However, unlike the second embodiment, when the abort counts are identical, the execution time-related information is compared, and a transaction having the shorter or smaller execution time-related information is aborted like the determination logic of the third embodiment.

The abort determination circuit 126 illustrated in FIG. 17 includes a fourth comparator 136 that determines whether the abort count CNT_1 of an abort counter is identical to the abort count CNT_2 of an invalidation request, a logic gate 137, and an OR gate 138.

The abort determination circuit 126 performs the following operations. When the abort count CNT_1 of the abort counter is not identical to the abort count CNT_2 of the invalidation request, the same operation as illustrated in FIG. 12 is performed, and an abort determination result AB1 indicating that a transaction having the smaller abort count is to be aborted is output. On the other hand, when both abort counts are identical, the same operation as illustrated in FIG. 16 is performed, and an abort determination result AB1 indicating that a transaction having the smaller execution time is to be aborted is output. When it is determined that a transaction is to be aborted after the abort count CNT_1 of the abort counter has reached the abort threshold Vth, an H-level abort handler jump determination result AB2 is output similarly to FIGS. 12 and 16.

Fifth Embodiment

Figure 18:
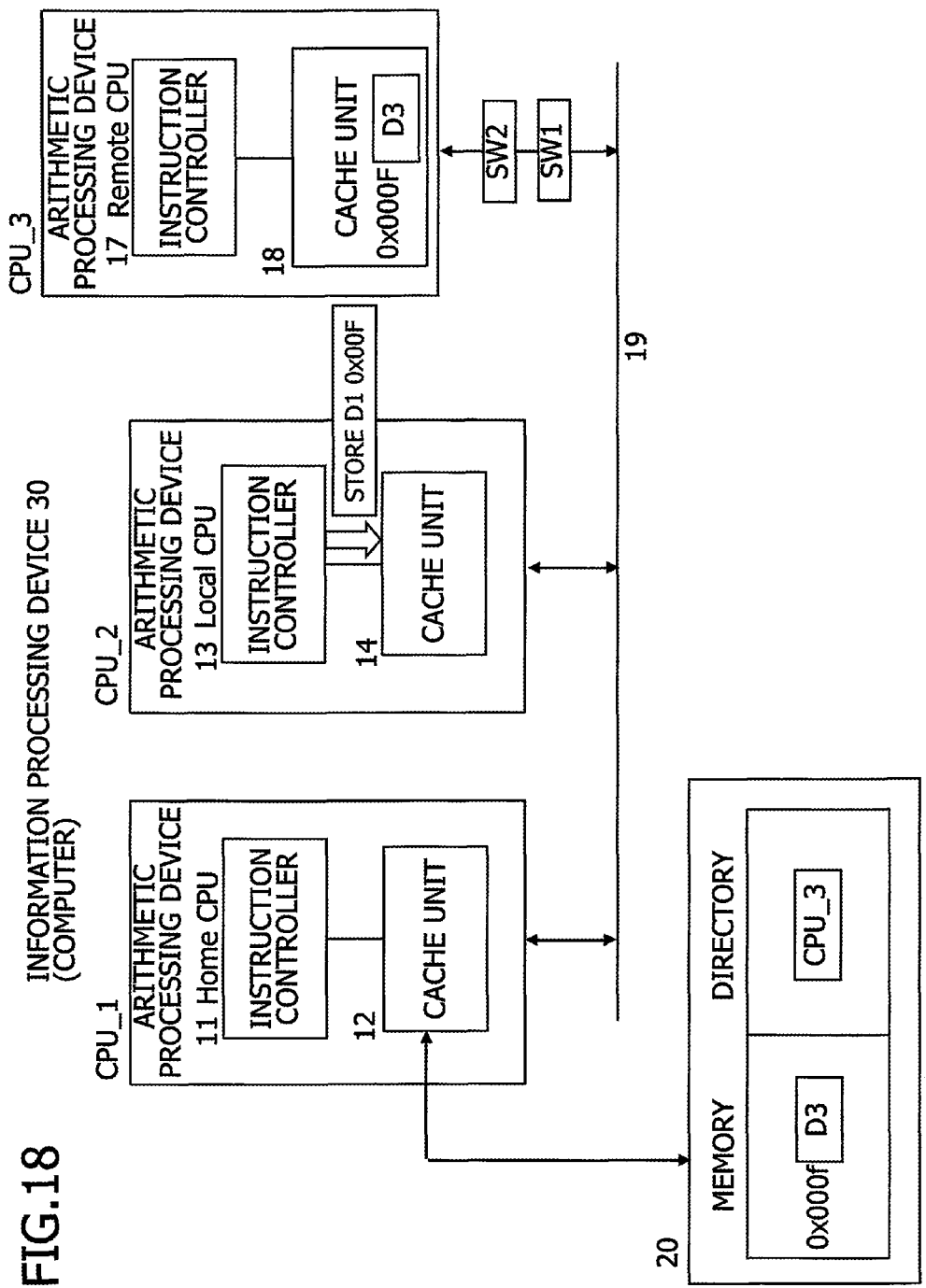
FIG. 18 is a diagram illustrating an information processing device (computer) according to a fifth embodiment.

FIG. 18 is a diagram illustrating an information processing device (computer) according to a fifth embodiment. The fifth embodiment is applied to a computer system having a cache coherent non-uniform memory access (NUMA) architecture.

The information processing device illustrated in FIG. 18 includes a plurality of arithmetic processing devices (CPU chips, hereinafter referred to simply as CPUs) CPU_1, CPU_2, and CPU_3 that are connected via a bus 19 and a plurality of network switches SW1 and SW2. Moreover, respective CPUs include instruction controllers 11, 13, and 17 and cache units 12, 14, and 18, respectively. The arithmetic processing device CPU_1 is a home CPU that manages a memory 20. A directory area for managing a CPU that caches data in the memory is provided in the memory 20. In the example of FIG. 18, data D3 at address 0x00f is cached in the cache unit 18 of the CPU_3. Due to this, the CPU_3 that caches the data in correspondence with the address 0x00f is stored in the directory within the memory 20.

In this manner, in a state where the CPU_3 caches the data D3 of the address 0x00f, the instruction controller 13 of the CPU_2 executes a store instruction to write data D1 in address 0x00f, the CPU_2 performs exclusive processing for maintaining cache coherency with the CPU_3 with the aid of a homeCPU_1 that manages the memory. The CPU_2 that executes the write instruction is referred to as a local CPU. Moreover, the CPU_3 that caches the data of a memory is referred to as a remote CPU.

In a computer system having the NUMA architecture, a local CPU (CPU_2) that executes a write instruction transmits a write request to a home CPU (CPU_1), the home CPU (CPU_1) detects a remote CPU (CPU_3) that has cached data of a write destination address by referring to the directory in the memory 20, and the home CPU (CPU_1) transmits an invalidation request to the remote CPU (CPU_3). In general, when a transaction conflicts with another transaction, the remote CPU (CPU_3) aborts the transaction in execution, invalidates a cache memory, and sends an invalidation completion report to the home CPU (CPU_1). Upon receiving the invalidation completion report, the home CPU (CPU_1) writes data to the write destination address of the memory in the write request and transmits a write completion report to the local CPU (CPU_2).

As described above, in a NUMA computer system, the time periods needed for memory accesses between a plurality of arithmetic processing devices CPU_1, CPU_2, and CPU_3 are not equal. Due to this, the closer a CPU located to the home CPU (CPU_1) that manages the memory, a larger number of accesses the CPU can execute in a predetermined period. Here, the CPU closer to the home CPU means a CPU of which the signal propagation time to the home CPU (CPU_1) is shorter. In the example of FIG. 18, since the remote CPU (CPU_3) is connected to the home CPU (CPU_1) via the network switches SW1 and SW2, the signal propagation time and the CPU-to-CPU distance are longer than those of the local CPU (CPU_2).

Thus, in order to perform abort determination more equally between conflicting transactions, the abort determination circuit of each CPU aborts a transaction of a CPU having the shorter CPU-to-CPU distance or does not abort a transaction of a CPU having the longer CPU-to-CPU distance to execute the transaction preferentially, based on information (for example, the number of network switches or a signal propagation time) on a physical CPU-to-CPU distance to a home CPU, of a CPU that is executing a conflicting transaction. In this way, it is possible to allow a CPU having the lower accuracy frequency to the home CPU to execute a transaction preferentially.

Figure 19:
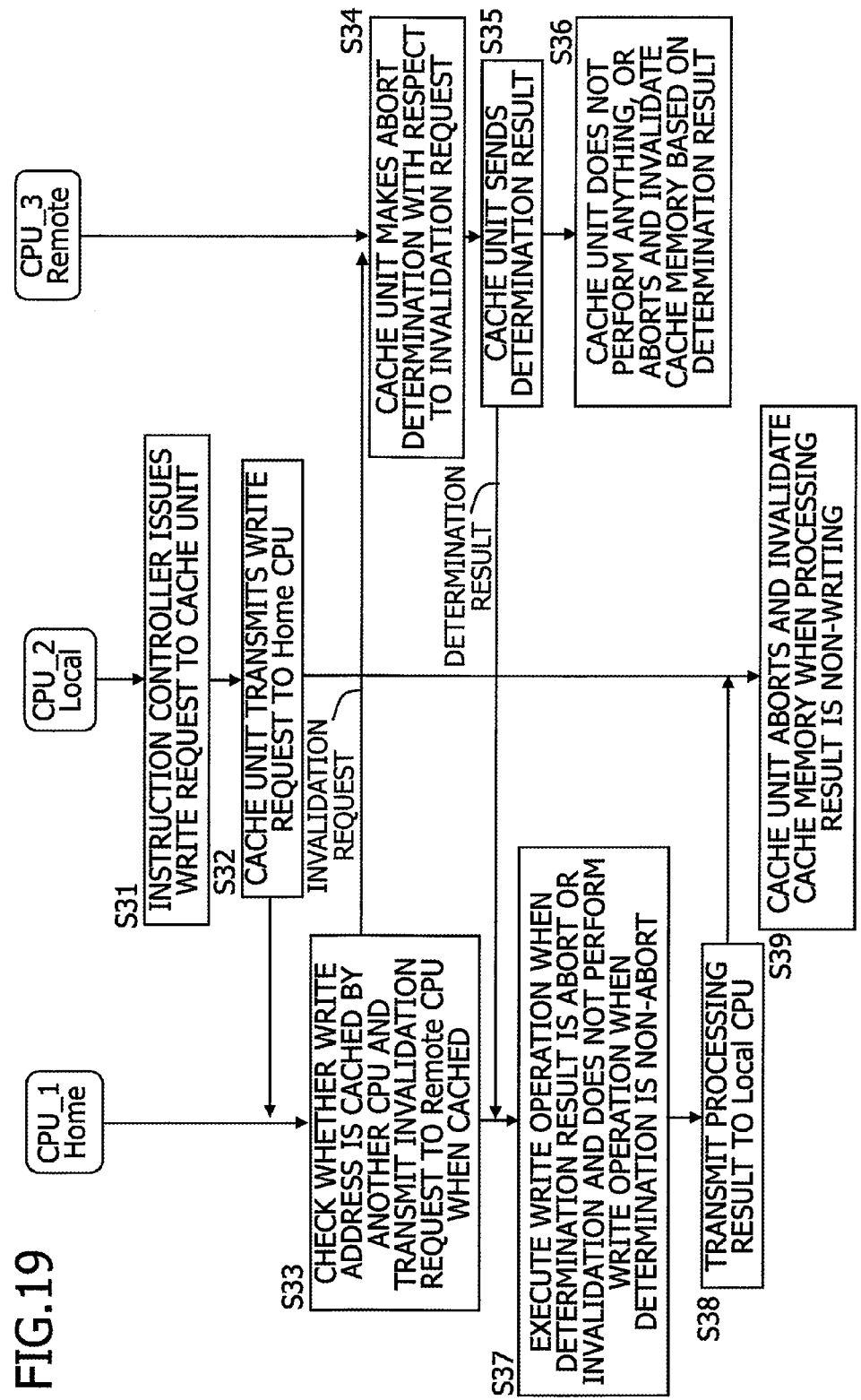
FIG. 19 is a flowchart of exclusive processing according to the fifth embodiment.

FIG. 19 is a flowchart of exclusive processing according to the fifth embodiment. In the information processing device, exclusive processing for maintaining cache coherency is performed as follows. The instruction controller 13 of the local CPU (CPU_2) issues a write request to the cache unit 14 (S31). In response to this, the cache unit 14 transmits a write request to the home CPU (CPU_1) (S32). This write request includes the ID of the local CPU (CPU_2), an access destination address, and the like.

The home CPU (CPU_1) checks whether data of the write destination address has already been cached to another CPU by referring to the directory in the memory 20 and transmits an invalidation request to the remote CPU (CPU_3) when the data has already been cached (S33). The invalidation request includes a CPU-ID (CPU_2) of the local CPU, an access destination address, and an abort request bit in addition to the CPU-ID (CPU_1) of the home CPU.

The cache unit 18 of the remote CPU (CPU_3) performs abort determination with respect to the received invalidation request (S34). In this abort determination, the cache unit 18 compares a temporal distance (for example, a signal propagation time) between the local CPU (CPU_2) and the home CPU (CPU_1) with a temporal distance between the remote CPU (CPU_3) and the home CPU (CPU_1) and determines that a transaction of a CPU having the shorter temporal distance is to be aborted and that a transaction of a CPU having the longer temporal distance is to be executed continuously. Since the longer the temporal distance, the lower the frequency with which the write request is received by the home CPU (CPU_1), by employing the above-described determination logic, it is possible to suppress a situation where a transaction of a specific CPU is aborted repeatedly, and consequently, the control jumps to software-based lock processing.

Figure 20:
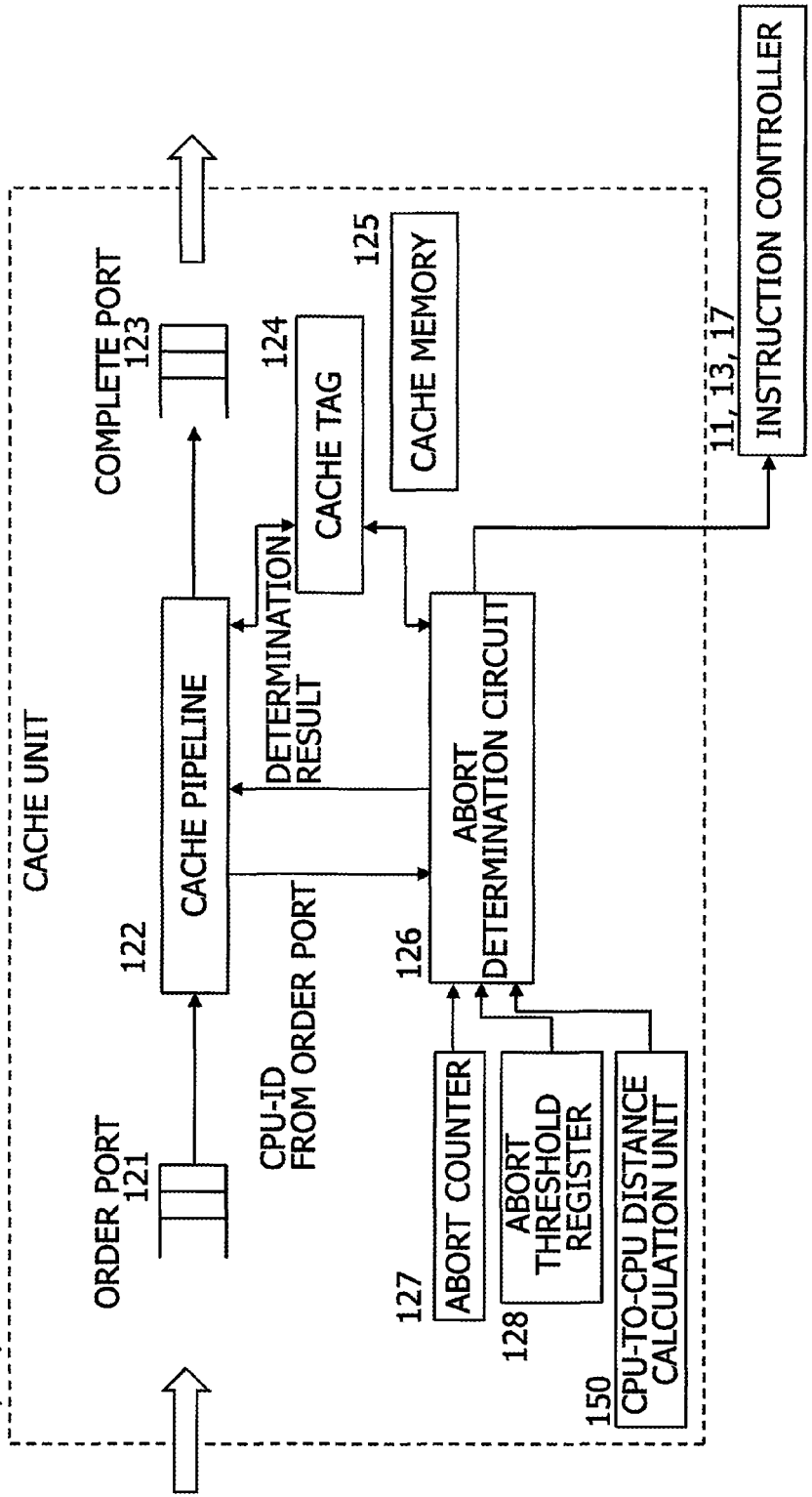
FIG. 20 is a diagram illustrating cache units 12, 14, and 18 according to the fifth embodiment.

FIG. 20 is a diagram illustrating cache units 12, 14, and 18 according to the fifth embodiment. The cache unit illustrated in FIG. 20 is different from the cache unit illustrated in FIGS. 9 and 14 in that a CPU-to-CPU distance calculation unit 150 is included. In this cache unit, the cache pipeline 122 transmits the CPU-ID of the local CPU in the invalidation request received by the order port 121 to the abort determination circuit 126, and the CPU-to-CPU distance calculation unit 150 calculates a temporal distance (CPU-to-CPU distance) between the local CPU (CPU_2) and the home CPU (CPU_1) based on the CPU-ID of the local CPU and outputs the CPU-to-CPU distance to the abort determination circuit 126. Moreover, the abort determination circuit 126 compares the temporal distance between the local CPU (CPU_2) and the home CPU (CPU_1) with a subject temporal distance between the subject CPU (the remote CPU (CPU_3)) and the home CPU (CPU_1) and determines that the subject transaction is to be aborted when the subject temporal distance is shorter.

Figure 21:
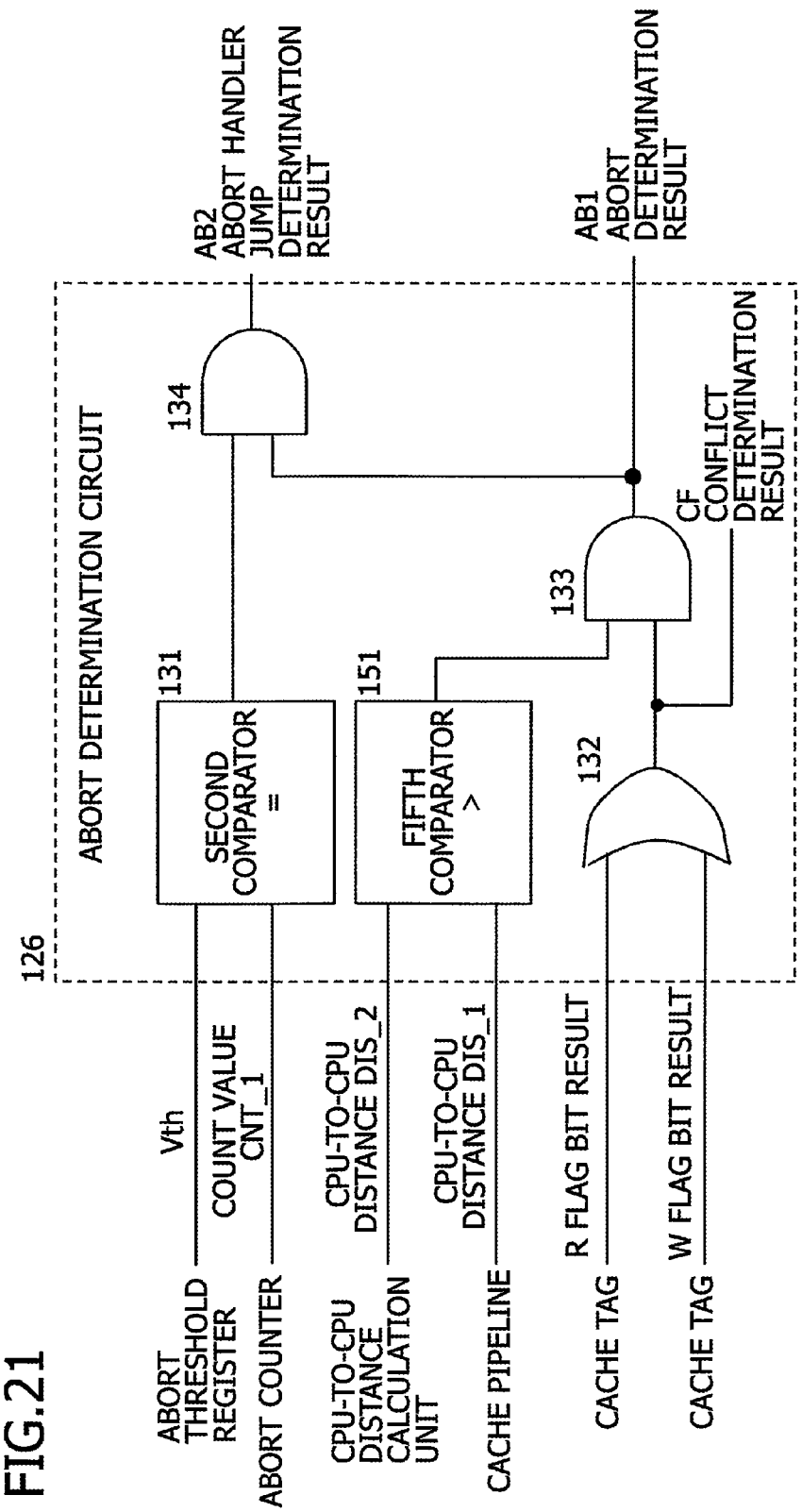
FIG. 21 is a circuit diagram of an abort determination circuit according to the fifth embodiment.

FIG. 21 is a circuit diagram of an abort determination circuit according to the fifth embodiment. The abort determination circuit is different from the abort determination circuit of FIG. 12 in that a fifth comparator 151 that compares temporal distances (CPU-to-CPU distances) is included instead of the first comparator 130. Moreover, the fifth comparator 151 outputs a determination result (H-level) that the subject transaction is to be aborted when the CPU-to-CPU distance DIS_1 of the subject CPU (that is, the remote CPU (CPU_3)) is shorter than the CPU-to-CPU distance DIS_2 of the local CPU (CPU_2) calculated by the CPU-to-CPU distance calculation unit (DIS_2>DIS_1). If DIS_2<DIS_1 on the other hand, a determination result (non-abort, L-level) that the subject transaction is not to be aborted is output. Thus, when the read flag R or the write flag W of the cache tag is "1" and the cache blocks of the write destination address conflict with each other (CF=H), an abort determination result AB1 is output according to the comparison result of the fifth comparator 151. The determination logic of the abort determination circuit in the fifth embodiment is the same as the logical value table illustrated in FIG. 12.

Returning to FIG. 19, the cache unit 18 of the remote CPU (CPU_3) sets an abort request bit based on the abort determination result and sends the abort request bit to the home CPU (CPU_1) (S35). This is the same as S14 of FIG. 6. The home CPU (CPU_1) executes a write operation when the abort determination result is abort and the abort request bit in the response is "0" (non-abort request), and does not execute a write operation in other cases (S37). Moreover, the home CPU (CPU_1) transmits the result of processing of the write request to the local CPU (CPU_2) (S38). In response to this, when the processing result is non-writing, the cache unit 14 of the local CPU (CPU_2) aborts a transaction in execution and invalidates the cache memory changed during the transaction (S39).

On the other hand, the cache unit 18 of the remote CPU (CPU_3) executes the transaction in execution continuously without performing anything or aborts the transaction in execution to invalidate the cache memory changed during the transaction based on the abort determination result (S36).

In FIG. 18, the CPUs CPU_1, CPU_2, and CPU_3 may be a remote CPU that receives an invalidation request to make abort determination as long as the CPU can be a local CPU that issues a write request. Thus, the cache units 12, 14, and 18 of these CPUs have the above-described constituent components and an abort determination circuit.

Moreover, the fifth embodiment can be applied similarly to when the CPUs CPU_1, CPU_2, and CPU_3 of FIG. 18 have a plurality of CPU cores and each CPU core has an instruction controller and a cache unit.

Sixth Embodiment

Figure 22:
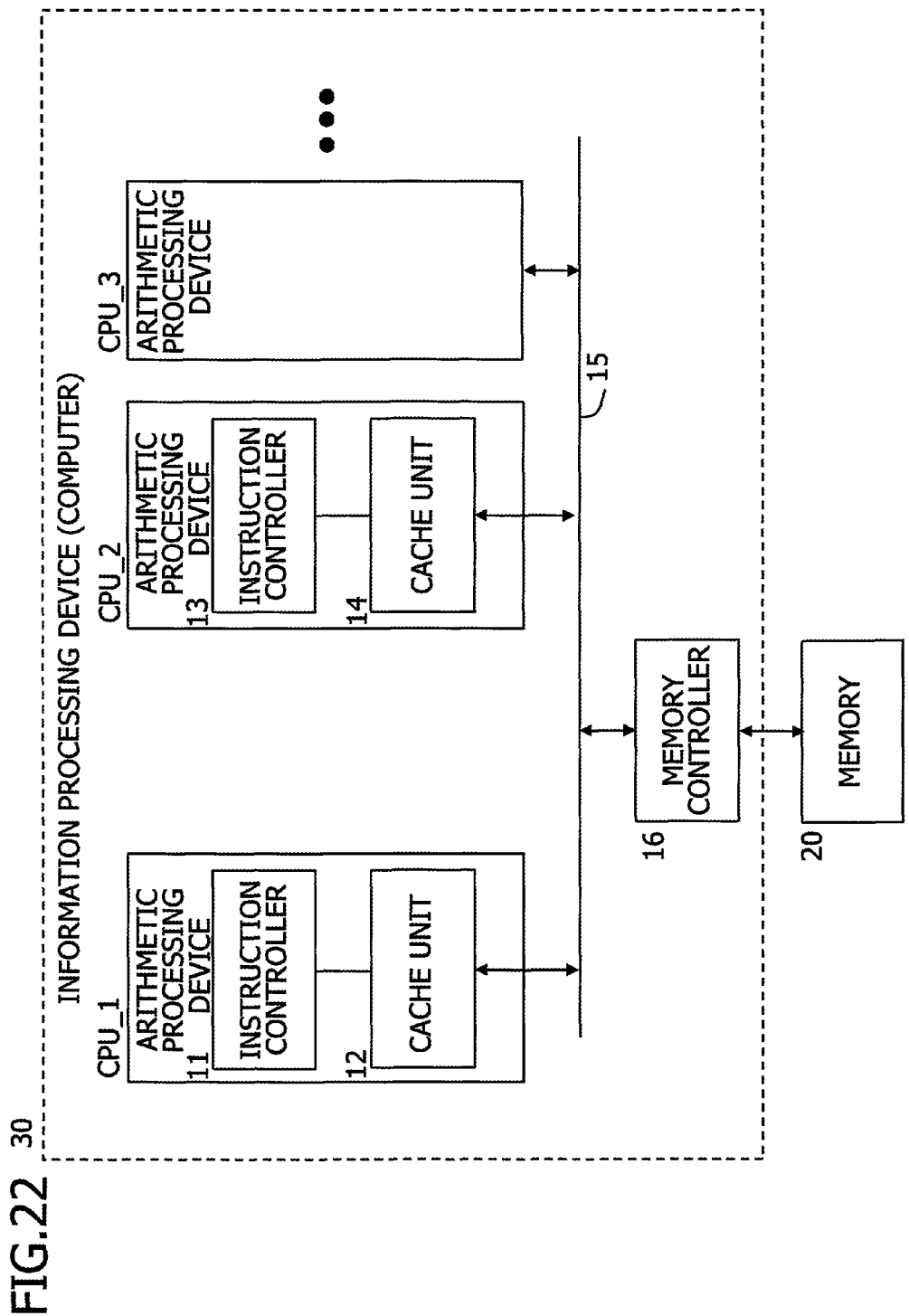
FIG. 22 is a diagram illustrating an information processing device according to a sixth embodiment.

FIG. 22 is a diagram illustrating an information processing device according to a sixth embodiment. The information processing device illustrated in FIG. 22 is a computer including a plurality of arithmetic processing devices (CPU chips) CPU_1, CPU_2, and CPU_3. The plurality of arithmetic processing devices (CPU chips) CPU_1, CPU_2, and CPU_3 shares the same memory 20. Thus, cache coherency needs to be maintained between the cache memories of the arithmetic processing devices (CPU chips) CPU_1, CPU_2, and CPU_3. Therefore, in the sixth embodiment, each cache unit executes the same abort determination as that of the second and third embodiments.

As described above, when a certain CPU (a CPU core or a CPU chip) issues a write request, the write request is transmitted to another CPU, the other CPU is caused to determine whether transaction conflicts occur and to determine whether a transaction in execution is to be aborted when conflicts occur. The CPU of which the transaction is determined to be aborted aborts the transaction and invalidates the cache block changed by the transaction. Moreover, since the abort determination is performed based on an abort count, execution time-related information of a transaction, a CPU-to-CPU distance, and the like, it is possible to make abort determination more equally. In this way, it is possible to suppress a situation where a transaction of a specific CPU is aborted repeatedly and processing is performed by a software abort handler. As described above, by having the CPU that has received the invalidation request perform the abort determination, it is possible to easily implement a hardware transactional memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a first arithmetic processing unit including a first instruction controller that controls a write instruction to a memory and a first cache unit having a first cache memory; and
a second arithmetic processing unit including a second instruction controller that controls a write instruction to the memory and a second cache unit having a second cache memory, wherein
the first arithmetic processing unit transmits an invalidation request to the second arithmetic processing unit when a write request to the memory is issued within a first transaction in execution by the first arithmetic processing unit the invalidation request including a destination address of the write request and a predetermined information, and
in response to the invalidation request, the second cache unit of the second arithmetic processing unit makes a first determination as to whether the second transaction conflicts with the first transaction for a cache block corresponding to the destination address of the write request, and a second determination as to whether a second transaction in execution by the second arithmetic processing unit is to be aborted based on the predetermined information, determines to abort the second transaction when both of the first and second determinations are true, or not to abort the second transaction when either the first or second determination is false, and sends a determination result to the first arithmetic processing unit.

2. The arithmetic processing device according to claim 1, wherein the predetermined information includes state information of the first transaction.

3. The arithmetic processing device according to claim 1, wherein
the predetermined information includes a first abort count of the first transaction, and
the second cache unit makes the second determination to be true when a second abort count of the second transaction is less than the first abort count.

4. The arithmetic processing device according to claim 1, wherein
the predetermined information includes first execution time-related information of the first transaction, and
the second cache unit makes the second determination to be true when second execution time-related information of the second transaction is shorter than the first execution time-related information.

5. The arithmetic processing device according to claim 4, wherein the execution time-related information is any one of an execution time which is an elapsed time from a start of execution of a transaction, a number of clock cycles from the start of execution, and a number of instructions executed from the start of execution.

6. The arithmetic processing device according to claim 1, wherein
when the determination result indicates that the second transaction is to be aborted, the second arithmetic processing unit aborts the second transaction and invalidates the cache memory changed by the second transaction, and the first arithmetic processing unit executes the write request, and
when the determination result indicates that the second transaction is not to be aborted, the second arithmetic processing unit continues executing the second transaction, and the first arithmetic processing unit aborts the first transaction and invalidates the cache memory changed by the first transaction.

7. The arithmetic processing device according to claim 1, wherein when the first determination is false, the second arithmetic processing unit continues executing the second transaction, and the first arithmetic processing unit executes the write request.

8. An information processing device according to claim 1, wherein the first arithmetic processing unit and the second arithmetic processing unit are a first arithmetic processing device and a second arithmetic processing device respectively.

9. An information processing device comprising:
- a first arithmetic processing device including a first instruction controller that controls a write instruction to a memory and a first cache unit having a first cache memory;
- a second arithmetic processing device including a second instruction controller that controls a write instruction to the memory and a second cache unit having a second cache memory; and
- a third arithmetic processing device that conducts an access to the memories, wherein
- the first arithmetic processing device transmits a write request to the third arithmetic processing device when a write request to the memory is issued within a first transaction in execution by the first arithmetic processing device,
- the third arithmetic processing device transmits an invalidation request to the second arithmetic processing device, and
- in response to the invalidation request, the second cache unit of the second arithmetic processing device determines whether a second transaction in execution by the second arithmetic processing device is to be aborted based on information included in the invalidation request when the second transaction conflicts with the first transaction for a cache block corresponding to a destination of the write request, and sends a determination result to the third arithmetic processing device.

10. The information processing device according to claim 9, wherein
- the information included in the invalidation request includes identification information of the first arithmetic processing device and an access destination memory address, and
- the second cache unit sends a determination result indicating that the second transaction is to be aborted to the first arithmetic processing device when a signal propagation time between the second arithmetic processing device and the third arithmetic processing device is shorter than a signal propagation time between the first arithmetic processing device and the third arithmetic processing device.

11. A method of controlling an information processing device that includes:
- a first arithmetic processing device including a first instruction controller that controls a write instruction to a memory and a first cache unit having a first cache memory;
- a second arithmetic processing device including a second instruction controller that controls a write instruction to the memory and a second cache unit having a second cache memory; and
- a third arithmetic processing device that conducts an access to the memory, the method comprising:
- by the first arithmetic processing device, transmitting a write request to the third arithmetic processing device when a write request to the memory is issued within a first transaction in execution by the first arithmetic processing device;
- by the third arithmetic processing device, transmitting an invalidation request to the second arithmetic processing device; and
- in response to the invalidation request, by the second cache unit of the second arithmetic processing device, determining whether a second transaction in execution by the second arithmetic processing device is to be aborted based on information included in the invalidation request when the second transaction conflicts with the first transaction for a cache block corresponding to a destination of the write request, and send a determination result to the third arithmetic processing device.

* * * * *